United States Patent
Lee et al.

(10) Patent No.: US 11,461,801 B2
(45) Date of Patent: Oct. 4, 2022

(54) DETECTING AND RESOLVING SEMANTIC MISALIGNMENTS BETWEEN DIGITAL MESSAGES AND EXTERNAL DIGITAL CONTENT

(71) Applicant: Adobe Inc., San Jose, CA (US)

(72) Inventors: Tak Yeon Lee, San Jose, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 371 days.

(21) Appl. No.: 15/910,926

(22) Filed: Mar. 2, 2018

(65) Prior Publication Data
US 2019/0272559 A1    Sep. 5, 2019

(51) Int. Cl.
*G06Q 30/02* (2012.01)
*G06F 40/30* (2020.01)
*G06Q 30/06* (2012.01)

(52) U.S. Cl.
CPC ......... *G06Q 30/0242* (2013.01); *G06F 40/30* (2020.01); *G06Q 30/0643* (2013.01)

(58) Field of Classification Search
CPC . G06Q 30/0242; G06Q 30/0643; G06F 40/30
See application file for complete search history.

(56) References Cited

U.S. PATENT DOCUMENTS

| | | | | |
|---|---|---|---|---|
| 2006/0259567 A1* | 11/2006 | Jennings | ............... | G06Q 10/107 709/207 |
| 2009/0292608 A1* | 11/2009 | Polachek | ............... | G06Q 30/02 705/14.44 |
| 2014/0316772 A1* | 10/2014 | Koll | ....................... | G16H 10/20 704/201 |
| 2016/0110433 A1* | 4/2016 | Sawhney | ................ | G06F 40/30 707/722 |
| 2019/0087915 A1* | 3/2019 | DeLuca | .................. | G06Q 50/01 |
| 2019/0197077 A1 | 6/2019 | Li et al. | | |
| 2021/0081294 A1 | 3/2021 | Golubev | | |

OTHER PUBLICATIONS

"How does Litmus Checklist work?" taken from the Help Center section on https://litmus.com/help/products/how-does-checklist-work/ dated Mar. 4, 2016, p. 1-7.
U.S. Appl. No. 16/419,676, Oct. 27, 2021, Office Action.
U.S. Appl. No. 16/419,676, Jun. 14, 2021, Office Action.
U.S. Appl. No. 16/419,676, Feb. 8, 2022, Notice of Allowance.

* cited by examiner

*Primary Examiner* — Alexandru Cirnu
(74) *Attorney, Agent, or Firm* — Keller Preece PLLC

(57) ABSTRACT

Methods, systems, and non-transitory computer readable storage media are disclosed for determining and resolving semantic misalignments between digital messages containing links and corresponding external digital content. For example, in one or more embodiments, the disclosed systems compare semantic message features from the digital message with semantic external digital content features from the external digital content. More specifically, in at least one embodiment, the disclosed systems compare semantic message feature vectors and semantic external digital content feature vectors to determine a relevance score for the digital message and identify semantic misalignments. Additionally, in one or more embodiments, the disclosed systems provide for display a user interface that presents a plurality of digital messages, the linked external digital content, and identified semantic misalignments.

20 Claims, 14 Drawing Sheets

Fig. 4B

DETECTING AND RESOLVING SEMANTIC MISALIGNMENTS BETWEEN DIGITAL MESSAGES AND EXTERNAL DIGITAL CONTENT

BACKGROUND

Recent years have seen significant improvement in hardware and software platforms for generating, providing, and tracking digital content across computing devices of a plurality of users. For example, developers have created digital content publishing systems that generate and transmit digital content to client devices of individual users, where the transmitted digital content includes links to additional external digital content that the client devices can access and provide to the individual users. Thus, for instance, conventional digital content publishing systems can generate customized emails for client devices of unique users, add links within the customized emails to additional digital content, transmit the emails to the client devices, and then provide the additional digital content as users interact with the digital links within the emails.

Although conventional digital content publishing systems can generate and provide digital messages to client devices of individual users, they have a number of shortcomings. Specifically, conventional digital content publishing systems are often inaccurate, inefficient, and inflexible. Indeed, conventional digital content publishing systems often send digital messages with links to external digital content that are (or become) outdated, incorrect, or otherwise inaccurate. For instance, external digital content is dynamic and often undergoes changes independently of digital messages transmitted to user client devices. For example, external digital content (such as a website) may be moved, deleted, or replaced with different information over time, even though a digital message transmitted to client devices of users has not changed. Accordingly, a client device that accesses a link from a digital message to external digital content often receives inaccurate data (e.g., error messages, mismatching contents, or redirection to a domain root) because the external digital content no longer aligns with the original digital message sent to the client device. In short, conventional digital content publishing systems face technical issues in accurately aligning dynamic external digital content with digital messages transmitted to client devices.

Additionally, conventional digital content publishing systems are often inefficient. Indeed, as misalignments arise between dynamic external digital content and digital messages, conventional systems and client devices waste computing resources and time in accessing and providing irrelevant digital content. In addition to the inefficient use of processing power and memory in accessing and providing irrelevant digital content, conventional systems and client devices also expend additional computing resources in seeking to identify and access the sought-after digital content. For example, a client device can repeatedly search for and access different portions of a website in search of digital content identified in an email (even though the external digital content has been removed or modified). Accordingly, both client devices and implementing systems inefficiently utilize computing resources as a result of misalignment between dynamic external digital content and digital messages.

Furthermore, digital content publishing systems are also inefficient in the amount of processing power and time required to identify misalignments. For example, in order to identify misalignments utilizing conventional digital content publishing systems, it is generally necessary to navigate to digital messages, select digital links, and access external digital content. This approach requires significant user interaction, processing power, and time to perform.

Furthermore, conventional digital message publishing systems are also inflexible. Indeed, conventional digital message systems rigidly provide digital messages to client devices and wait for misalignments to arise within the digital messages. Accordingly, the inaccuracy and inefficiency of conventional digital message systems is also a result of the inflexibility of conventional digital message systems in generating and providing digital messages.

These and other disadvantages exist with respect to conventional digital content publishing systems.

SUMMARY

One or more embodiments provide benefits and/or solve one or more of the foregoing or other problems in the art with systems, methods, and non-transitory computer readable storage media for automatically identifying and presenting semantic misalignments between digital messages and external digital content within a digital content campaign. For example, the disclosed systems can identify, within a digital message (e.g., an email) a link to external digital content (e.g., a landing page). The disclosed systems can extract semantic message features from digital messages containing the link and external digital content features from the external digital content associated with the link. In one or more embodiments, the disclosed systems compare the semantic message features and the semantic external digital content features to determine a semantic misalignment (e.g., by comparing vectors of the digital message and the digital content within a semantic vector space). Furthermore, in one or more embodiments, the disclosed systems notify a publisher associated with the digital message of the misalignment by presenting semantic misalignments corresponding to one or more digital content campaigns to the publisher via a graphical user interface that comprises a plurality of digital messages and corresponding misalignments.

The disclosed systems provide a variety of advantages over conventional systems. Indeed, the disclosed systems can improve accuracy by automatically identifying and presenting semantic misalignments between digital messages and external digital content. Moreover, the disclosed systems can improve efficiency by reducing computing resources devoted to providing irrelevant digital content and searching for relevant digital content. Furthermore, the disclosed systems improve efficiency and flexibility by automatically identifying, gathering, and providing semantic misalignments into a user interface that allows publishers to modify digital messages and/or external digital content to flexibly resolve misalignments across one or more digital content campaigns.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 4A-4C illustrate a series of example user interfaces presented by the digital misalignment system in accordance with one or more embodiments;

DETAILED DESCRIPTION

Figure 1:
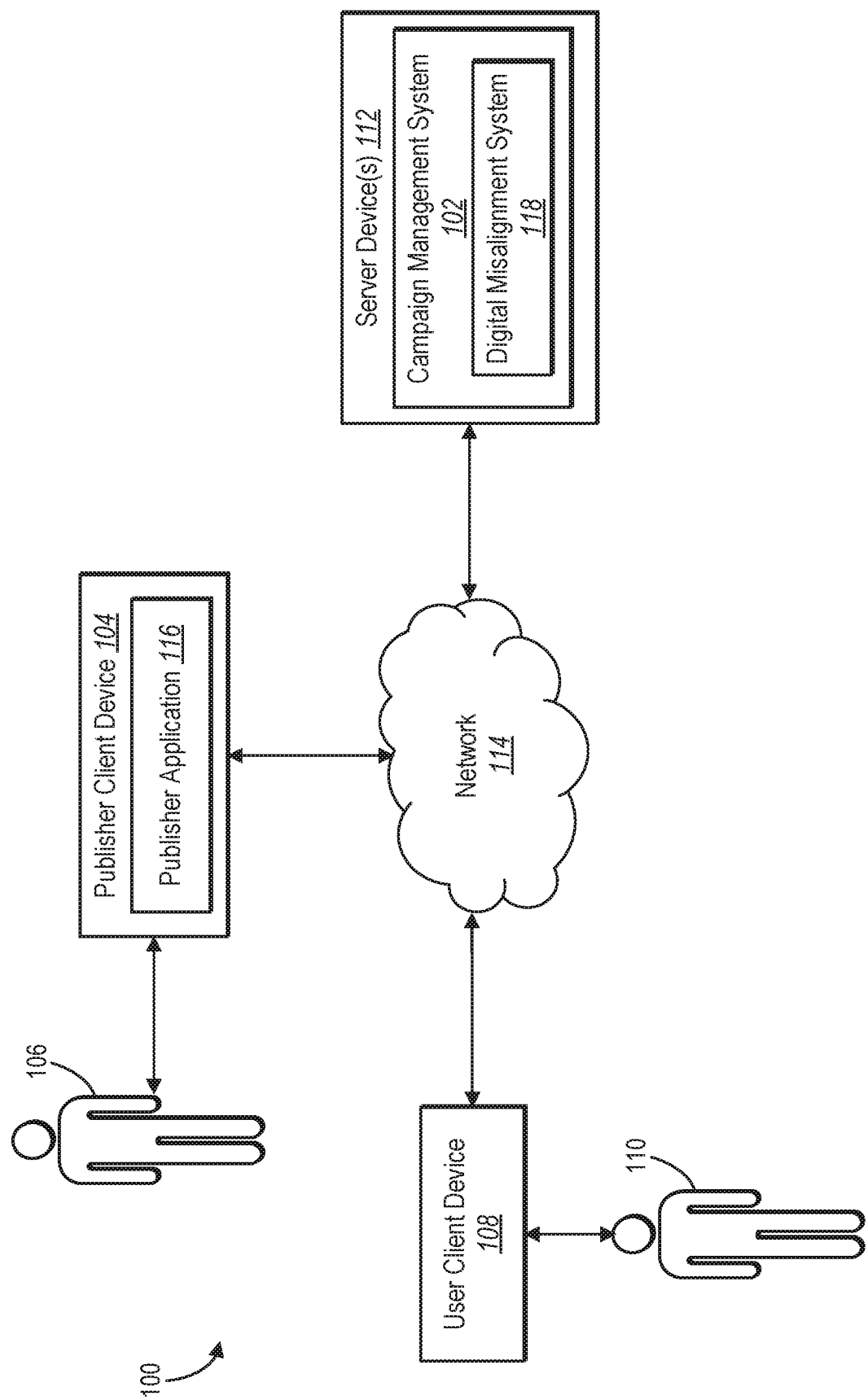
FIG. 1 illustrates an environment in which a digital misalignment system can operate in accordance with one or more embodiments.

One or more embodiments of the present disclosure include a digital misalignment system that automatically identifies and presents semantic misalignments between digital messages and external digital content within a digital content campaign. Specifically, the digital misalignment system can monitor changes to external digital content over time and detect misalignments between the external digital content and digital messages that reference the external digital content. To illustrate, the digital misalignment system can extract features from digital messages (e.g., emails) and external digital content (e.g., landing pages). Trained by ground-truth examples, the digital misalignment system can extract feature vectors from both text and images of digital messages and external digital content. Moreover, the digital misalignment system can adjust the feature vectors based on structure of the digital messages and/or external digital content. The digital misalignment system can compare feature vectors of the digital messages and external digital content (e.g., within a semantic vector space) to identify semantic misalignments. Moreover, the digital misalignment system can present digital notifications of the semantic misalignments to publishers via one or more unique user interfaces. In this manner, the digital misalignment system can efficiently, accurately, and flexibly resolve misalignments between digital messages and corresponding external digital content.

For example, in one or more embodiments, the digital misalignment system identifies, within a digital message, a digital link to external digital content. The digital misalignment system can extract semantic message features from the digital message and semantic external digital content features from the external digital content. Moreover, the digital misalignment system can determine a semantic misalignment between the digital link and the external digital content by comparing the semantic message features and the semantic external digital content features. Upon identifying the semantic misalignment, the digital misalignment system can provide for display to a publisher device a notification of the semantic misalignment.

As just mentioned, in one or more embodiments, the digital misalignment system extracts semantic features from a digital message and external digital content. In particular, the digital misalignment system can extract semantic features from images and text of a digital message and/or images and text of the external digital content associated with the link. To illustrate, the digital misalignment system can extract text as a semantic feature directly from a digital message. Similarly, the digital misalignment system can extract semantic features from images utilizing image recognition, tags, or optical character recognition.

Upon extracting semantic features, the digital misalignment system can compare the semantic features. For example, as mentioned above, in one or more embodiments, the digital misalignment system generates and compares feature vectors in a semantic vector space. Specifically, the digital misalignment system can generate message feature vectors from extracted components of the digital message and external digital content feature vectors from extracted components of the external digital content. The digital misalignment system can then compare the semantic message feature vectors and the semantic external digital content feature vectors to identify semantic misalignments.

To illustrate, in one or more embodiments, the digital misalignment system compares the semantic message feature vectors and the semantic external digital content features to generate a relevancy score. For example, the digital misalignment system can apply a cosine similarity (or other similarity metric) to the semantic message feature vectors and the semantic external digital content features in the semantic feature space, resulting in a relevancy score. If the relevance score fails to satisfy a relevance score threshold the digital misalignment system can identify a semantic misalignment between the digital message and the external digital content.

As mentioned above, the digital misalignment system can also utilize structure of a digital message and/or structure of external digital content to identify semantic misalignment. Indeed, in one or more embodiments, the digital misalignment system extracts different semantic message features (and generates different vectors) for different portions of a digital message and/or different portions of external digital content. For example, the digital misalignment system can extract global message features from a digital message (e.g., features from all text and/or images in a digital message). The digital misalignment system can also extract digital link features from a digital link within the digital message (e.g., features specific to the text and/or images of the digital link).

The digital misalignment system can then utilize both the global message features and the digital link features. For example, the digital misalignment system can generate a global message feature vector and a link feature vector and combine the global message feature vector and the link feature vector to generate a semantic message feature vector. Indeed, in one or more embodiments, the digital misalignment system weights the link feature vector in generating the semantic message feature vector to emphasize semantic similarity to the link. By generating different feature vectors for different structural portions of the digital message (and/ or external digital content), the digital misalignment system can more accurately identify semantic misalignments.

As mentioned above, once the digital misalignment system has detected a semantic misalignment between the digital message and the external digital content, the digital misalignment system can present the semantic misalignment via one or more user interfaces via a publisher device. For example, in at least one embodiment, the digital misalignment system provides a user interface that includes emails sent by the publisher device within a digital content campaign together with an identification of which emails include semantic misalignments. In addition, the digital misalignment system can provide a user interface that include an email with a semantic misalignment, links found in the email, links corresponding to semantic misalignments, the landing pages associated with the links, overlapping keywords between the email and landing pages, and relevance scores/semantic misalignments for each of the links. The publisher may interact with the user interface to identify and correct semantic misalignments.

In addition, as mentioned previously, the digital misalignment system can also monitor digital messages and corresponding external digital content over time to identify and resolve semantic misalignments. Indeed, in one or more embodiments, the digital misalignment system periodically monitors changes to external digital content. Based on detected changes, the digital misalignment system can detect semantic misalignments as they arise. For example, the digital misalignment system can extract modified semantic features from external digital content, compare the modified semantic features to semantic message features, and identify semantic misalignments. In this manner, the display misalignment system can flexibly, accurately, and efficiently identify and resolve semantic misalignments for digital messages over time (even after the digital messages have been sent).

The display misalignment system provides a number of advantages over conventional digital content publishing systems. For example, the digital misalignment system can improve accuracy relative to conventional systems. Specifically, the digital misalignment system can extract features from digital messages and external digital content to identify inaccurate semantic misalignments between the digital messages and the external digital content. Accordingly, the digital misalignment system can correct inaccurate and erroneous links in digital messages before they are sent to client devices. Moreover, the digital misalignment system can identify semantic misalignments that arise after digital messages are transmitted to client devices and assist in resolving these inaccuracies.

Furthermore, the display misalignment system can also improve efficiency. For example, the digital misalignment system can reduce computing resources utilized to identify and provide irrelevant digital content resulting from misaligned links. Moreover, the digital misalignment system can reduce processing power utilized to search for, identify, and provide relevant digital content. Indeed, by identifying and resolving semantic misalignments, the digital misalignment system can avoid the processing cost of providing inaccurate digital content and the processing cost of searching for digital content that client devices actually seek. The display misalignment system can also reduce the number of client devices that navigate away from websites as a result of being presented with irrelevant digital content.

The display misalignment system can also improve efficiency and performance of computing systems by providing semantic misalignments via one or more user interfaces. For example, the display misalignment system can identify and provide graphical user interfaces that include digital messages, digital links, semantic misalignments, and external digital content to one or more publisher client devices. These user interfaces reduce the computing power and time associated with conventional systems (that often require extensive navigation, time, and review to identify misalignments).

In addition, the display misalignment system also provides greater flexibility. For instance, the digital misalignment system can identify semantic misalignments in emails before or after transmission to a client device, gather/organize the semantic misalignments, and provide the semantic misalignments for display to publisher devices for resolution of the semantic misalignments. Accordingly, rather than rigidly providing digital messages that include (or develop) inaccurate misalignments, the digital misalignment system can flexibly identify and modify digital content over time to reduce semantic misalignments.

As illustrated by the foregoing discussion, the present disclosure utilizes a variety of terms to describe features and advantages of the digital misalignment system. Additional detail is now provided regarding the meaning of such terms. For example, as used herein, the term "digital message" (or "message") refers to an electronic communication between at least two client devices. In particular, a digital message includes an electronic communication between at least two client devices that includes visual digital content. For example, a digital message can include an email, text message, instant message, or social media post. A digital message can include digital content (or digital media) such as digital text, digital images, or digital video associated with a digital content campaign. Moreover, the term digital message can include a static digital message or a dynamic digital message.

Additionally, the terms "digital content campaign" and "campaign" refer to a series of activities, parameters, and/or rules used in connection with providing digital content corresponding to a product, service, group, individual, entity, or other category. For instance, a digital content campaign can include digital messages comprising digital content about a product, service, group, individual, entity, or other category. Moreover, a digital content campaign can include campaign parameters such as a target audience, budget, or constraints for delivering digital content. Executing the digital content campaign, therefore, can include sending the digital messages to a target audience that can include recipients that share one or more characteristics according to one or more campaign parameters.

As used herein, the term "digital link" (or "link") refers to a reference to data. In particular, digital link can include a reference to data (e.g., a document, webpage, or other digital media) that a user can directly follow by clicking, tapping, or hovering. For example, a digital link can include a hyperlink in a digital message that references/points to a website. When a user clicks, taps, or hovers over the link, the user's computing device may open a new interface including the external digital content.

As used herein, the term "external digital content" refers to digital content referenced by a link. In particular, external digital content can include the target location of a link within a digital message (i.e., a target location remote from a user client device accessing the digital message). For example, "external digital content" can refer to an electronic document or webpage (i.e., a landing page) accessible via a link of a digital message. For instance, external digital content can include a landing page (e.g., website) a digital link within an email. The content of the landing page may be misaligned with the content of the message or the digital link.

As used herein, the term "semantic features" refers to characteristics or traits of a digital messages and/or external digital content. In particular, semantic features can include characteristics of a digital message and/or external digital content that indicate a semantic meaning. For instance, semantic features can include components of meaning in digital messages and external digital content extracted by a digital misalignment system. Specifically, semantic message features (i.e., semantic features for a message) can include digital text or an indicator of objects portrayed in a digital message. Semantic external digital content features (i.e., semantic features for external digital content) can include digital text or an indicator of objects portrayed in external digital content. For example, semantic features can include, but are not limited to, digital text or analytics data obtained via Optical Character Recognition (OCR), Alternative Text (Alt Text or Alt tags), and image recognition. The term semantic features can also include a feature vector. For example, semantic features can include a feature vector in a semantic space reflecting the meaning of text or images from a digital message (i.e., semantic message feature vector) and/or external digital content (i.e., semantic external digital content feature vector).

As used herein, the term "relevance score" refers to a representation associated with relevance. In particular, relevance score includes a value that reflects the semantic relevance between two digital objects. More specifically, the digital misalignment system can calculate a relevance score between the semantic message features and the semantic external digital content features. The digital misalignment system can compare a relevance score to a relevance score threshold to identify a semantic misalignment between digital message content and external digital content.

As used herein, the term "semantic misalignment" refers to a disparity in semantics. In particular, semantic misalignment includes a meaningful semantic difference between the semantic features, as described above, of a digital message containing a link and the semantic features of external digital content associated with the link. More specifically, a semantic misalignment might be detected when a relevance score, which reflects the difference between the semantic features of the digital message content and the semantic features of the external digital content, meets a threshold.

Referring now to the figures, FIG. 1 illustrates an embodiment of an environment 100 in which a digital misalignment system 118 operates. In particular, the environment 100 includes a publisher client device 104 associated with a publisher 106, a user client device 108 associated with a user 110, and server device(s) 112. The server device(s) 112, the publisher client device 104, and the user client devices 108 may be communicatively coupled with each other either directly or indirectly (e.g., through network 114, discussed in greater detail below in relation to FIG. 8). Furthermore, the server device(s) 112 includes the campaign management system 102, which includes a digital misalignment system 118. As mentioned above, the campaign management system 102 utilizes the digital misalignment system 118 to identify misalignments in digital messages and external digital content (e.g., digital messages and external digital content generated by the publisher 106 via the publisher client device 104).

As shown in FIG. 1, the environment 100 includes a user client device 108 associated with a user 110 and a publisher client device 104 associated with a publisher 106. The user client device 108 and the publisher client device 104 can include a smartphone, tablet, desktop computer, laptop computer, or other device that is able to send and/or receive digital messages via the network 114 (e.g., any of the devices discussed below in reference to FIG. 8).

As illustrated in FIG. 1, the publisher client device 104 also includes the publisher application 116. The publisher 106 (via the publisher application 116 running on the publisher client device 104) can review, plan, modify, and/or execute digital content campaigns. For example, the publisher client device 104 can utilize the publisher application 116 to generate digital messages, generate (or modify) external digital content, and/or select campaign parameters (e.g., a budget, targeted user characteristics, or distribution channels) for a digital content campaign.

Similarly, as illustrated in FIG. 1, the environment 100 also includes the server device(s) 112. The server device(s) 112 can generate, store, receive, and/or transmit any type of data, including digital messages and/or external digital content. For example, the server device(s) 112 may receive digital messages and/or external digital content from the publisher client device 104. The server device(s) 112 can also transmit digital messages and/or external digital content to the user client device 108. In one or more embodiments, the server devices (112) may include a data server. The server device(s) 112 can also include a communication server (for sending digital messages) or a web-hosting server (for hosting a landing page).

As shown in FIG. 1, the server device(s) 112 can include the campaign management system 102 (which also includes the digital misalignment system 118). The campaign management system 102 can manage, create, modify, and/or execute a digital content campaign associated with a product, service, individual, entity, or other category. For example, the campaign management system 102 can identify one or more user client devices (e.g., the user client device 108) and provide customized digital content to the user client devices based on one or more campaign parameters. Furthermore, the campaign management system 102 can identify, generate, or receive campaign parameters and/or digital content for executing a digital content campaign. For example, the campaign management system 102 can receive digital content and/or campaign parameters from the publisher client device 104.

The campaign management system 102 can send digital messages (e.g., email or instant message) for a digital content campaign. The campaign management system 102 can also store external digital content for a digital content campaign. For example, the campaign management system 102 can send a digital message with a link to a landing page hosted on the server device(s) 112.

As shown in FIG. 1, the campaign management system 102 also includes the digital misalignment system 118. The digital misalignment system 118 can identify and resolve one or more semantic misalignments between links in digital messages and corresponding external digital content. To illustrate, in one or more embodiments, the campaign management system 102 (via the server device(s) 112) transmit a plurality of digital messages to client devices (e.g., including the user client device 108) with digital links to external digital content (e.g., external digital content hosted at the server device(s) 112). The publisher client device 104 can register the digital messages with the digital misalignment system 118 (e.g., to track the digital messages and ensure that the digital links do not become semantically misaligned). In response, the digital misalignment system 118 can extract semantic features from the external digital content and the registered digital messages to identify a semantic misalignment. Specifically, the digital misalignment system 118 can extract semantic message features from the registered digital messages and semantic external digital content features from external digital content, generate semantic message feature vectors and semantic external digital content feature vectors, and compare the semantic message feature vectors and semantic external digital content feature vectors to calculate relevance scores.

In addition, the digital misalignment system 118 can use the relevance scores calculated by the digital misalignment system 118 to determine a semantic misalignment. Moreover, the digital misalignment system 118 can provide for display, on the publisher client device 104, a notification indicating the semantic misalignment. Moreover, the digital misalignment system 118 may prompt the publisher 106 to correct semantic misalignments found within the digital content campaign. In one or more alternative embodiments, the digital misalignment system 118 automatically resolves the semantic misalignments (e.g., by altering external digital content hosted at the server device(s) 112, sending updated digital messages with modified digital links, or by altering any subsequent digital messages comprising the digital link to include a corrected digital link).

As illustrated by the previous example embodiments, the digital misalignment system 118 (and/or the campaign management system 102) may be implemented in whole, or in part, by the individual elements of environment 100. Although FIG. 1 illustrates the digital misalignment system 118 (and the campaign management system 102) implemented with regard to server device(s) 112, it will be appreciated that the digital misalignment system 118 (and/or the campaign management system 102) can be implemented in any of the components of the environment 100. For example, campaign management system 102 and the digital misalignment system 118 can be implemented in whole, or in part, by the publisher client device 104 (e.g., by sending digital messages via the publisher client device 104, hosting external digital content at the publisher client device 104, identifying misalignments at the publisher client device 104, etc.).

Furthermore, although the environment 100 of FIG. 1 is depicted as having various components, the environment 100 may have any number of additional or alternative components. For example, in one or more embodiments, a third-party server (not illustrated) hosts external digital content and/or transmits digital messages to the user client device 108.

Figure 2A:
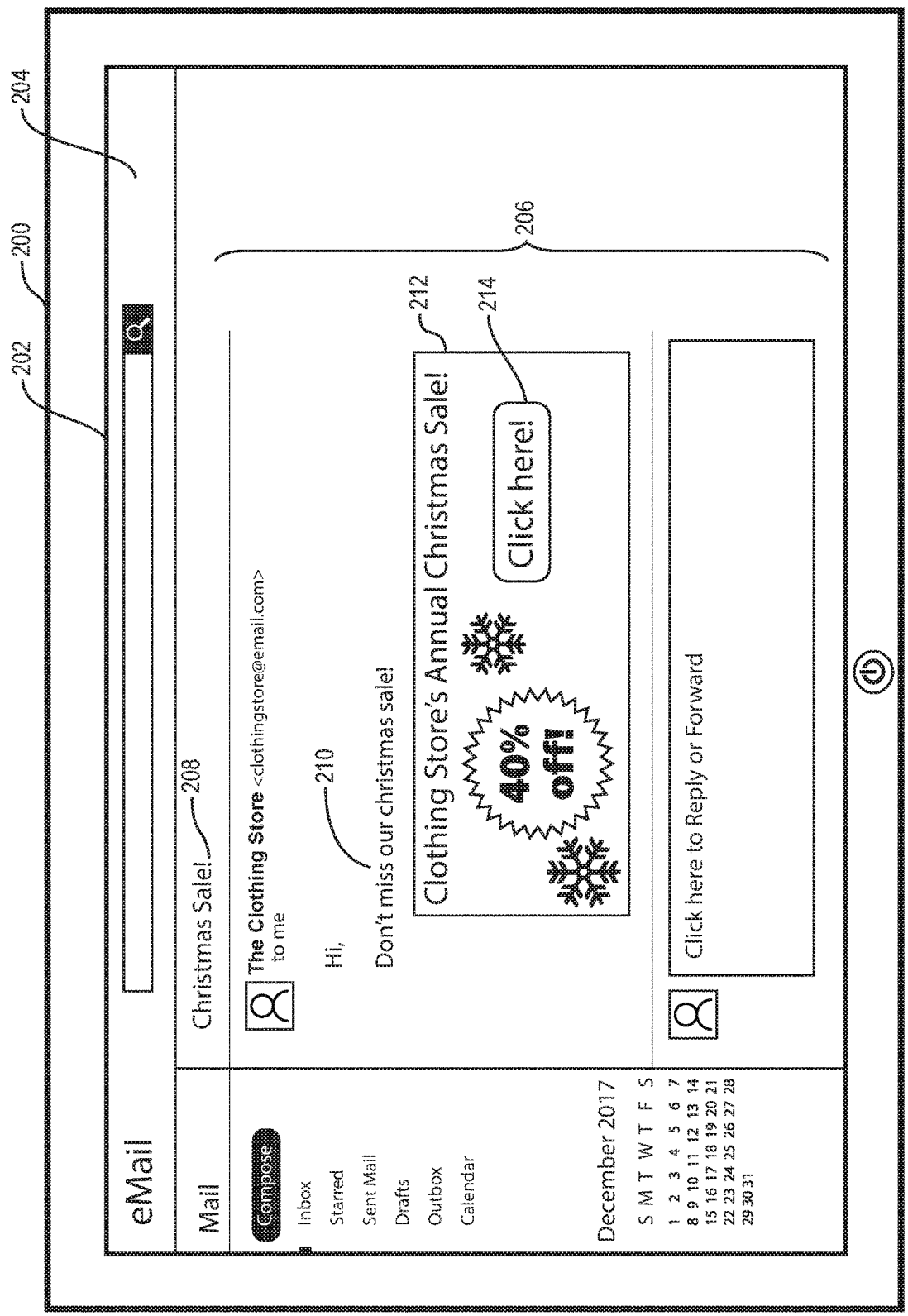
FIGS. 2A-2C illustrate an example email and example landing pages in accordance with one or more embodiments.
Figure 2B:
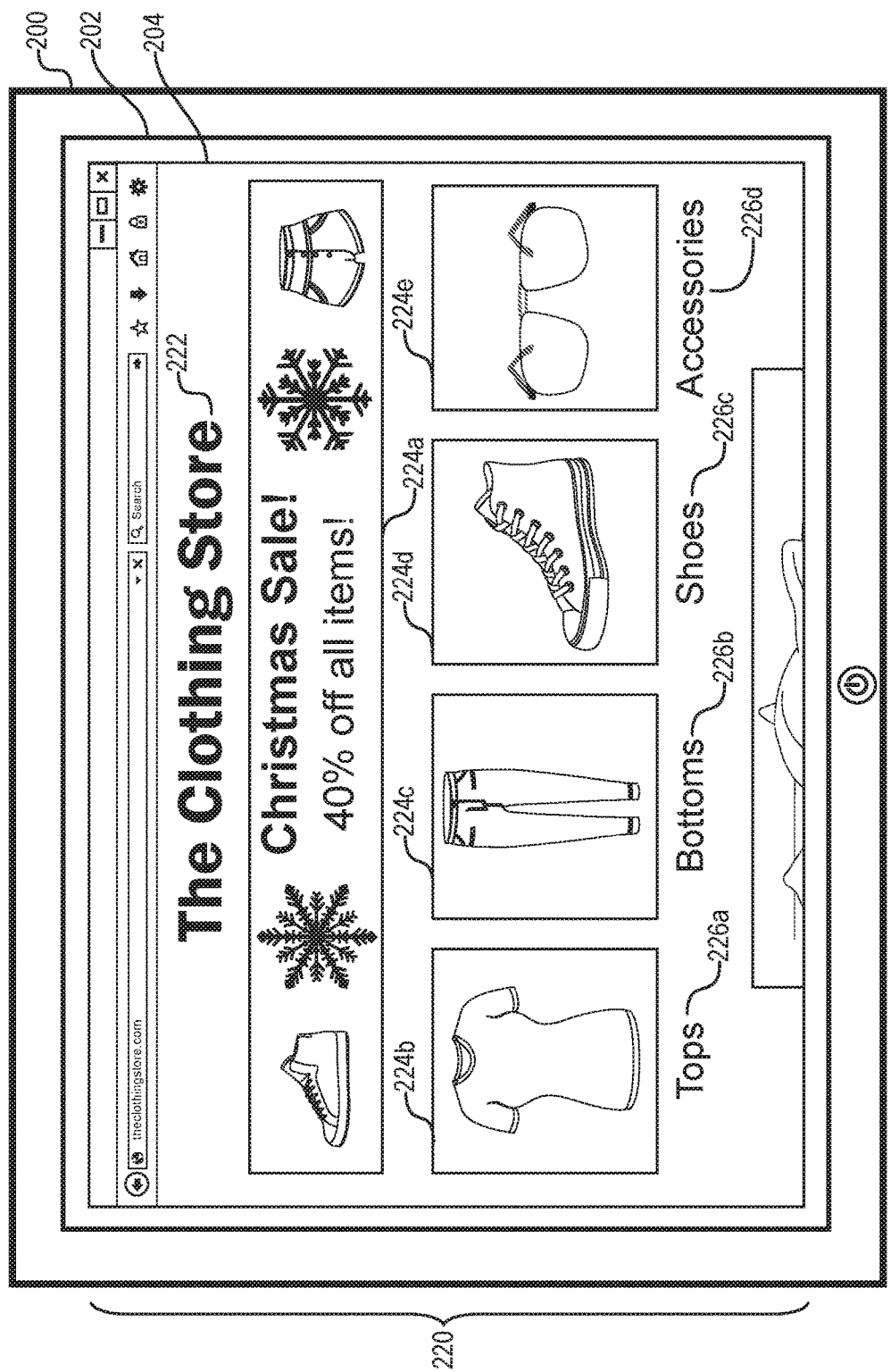
Figure 2C:
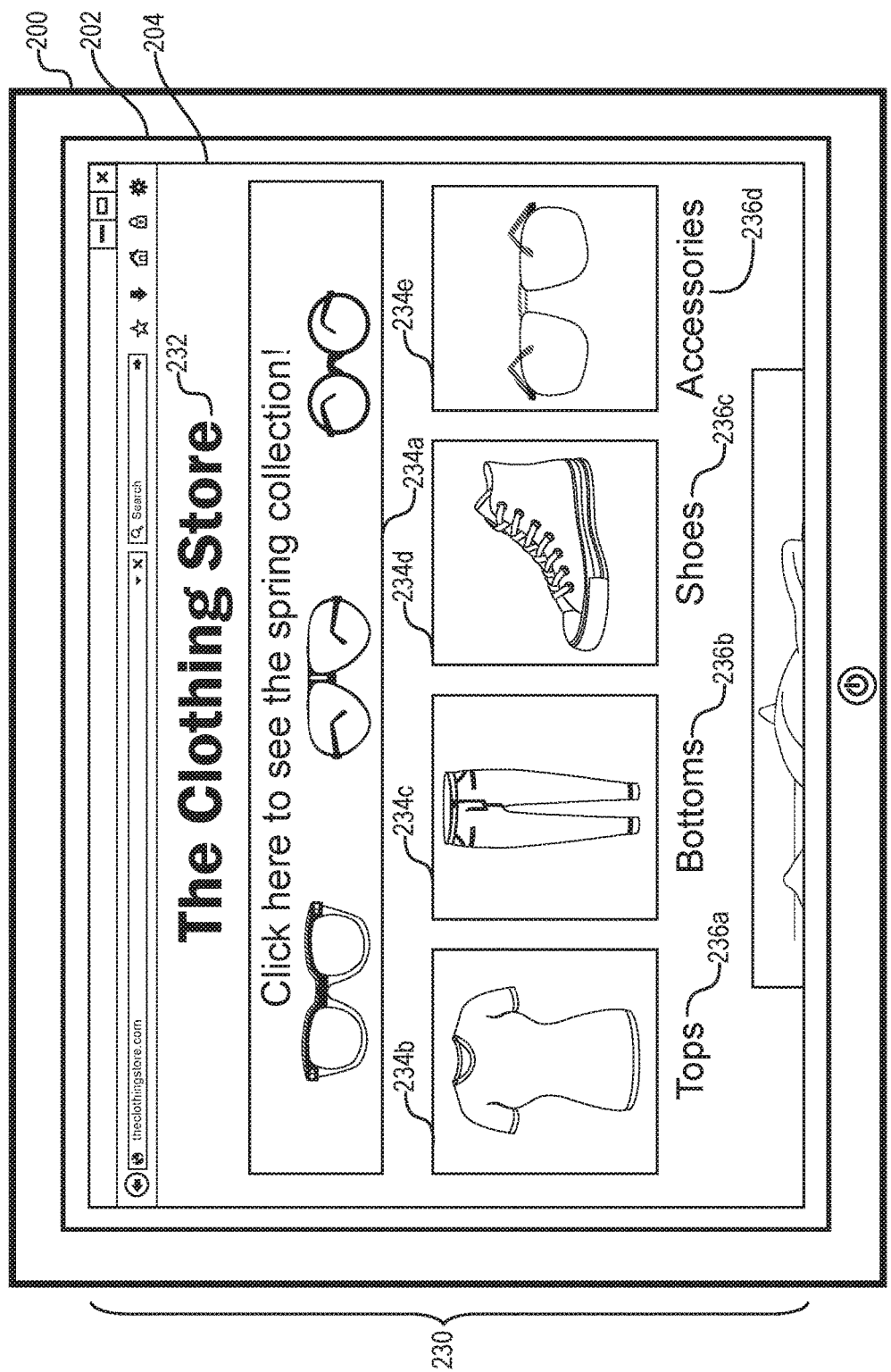

As discussed above, in one or more embodiments, the digital misalignment system 118 can identify and resolve misalignments between digital links in digital messages and external digital contents. FIGS. 2A-2C illustrate an example email and example landing pages, including a misalignment between a digital link in an email and a corresponding landing page, in accordance with one or more embodiments. Specifically, FIG. 2A illustrates an example digital message associated with a digital content campaign that comprises a link. FIG. 2B illustrates an example aligned landing page associated with the link in the digital message. In comparison with FIG. 2B, FIG. 2C illustrates an example landing page that has become misaligned with the digital message.

As shown in FIG. 2A, a client device 200 presents a graphical user interface 204 via a display screen 202. The graphical user interface 204 includes a digital message 206 including digital elements 208-214 relating to a "Clothing Store's Annual Christmas Sale." As shown, the digital message 206 includes a message subject 208, message text 210, a message image 212, and a message link 214 to external digital content. For example, the message subject 208 and the message text 210 both include language referring to the "Christmas Sale." Additionally, the message image 212 includes both text and images (e.g., snowflakes) relevant to the Christmas sale.

The message link 214 originally points to external digital content corresponding to the "Christmas Sale." For instance, as shown in FIG. 2B, after receiving an indication of the selection of the message link 214, the client device 200 provides an aligned landing page 220 for display. The aligned landing page 220 includes a subject 222, images 224a-224e, and text 226a-226d relevant (i.e., semantically aligned) to the digital message 206. For example, the aligned landing page 220 pertain to the "Christmas Sale" at "The Clothing Store" as indicated by the subject 222, the images 224a-224e, and the text 226a-226d.

In contrast, FIG. 2C illustrates an example of a misaligned landing page 230. Specifically, a publisher modifies the landing page illustrated in FIG. 2B to refer to a new sale. After receiving an indication of the selection of the message link 214, and as shown in FIG. 2C, the client device 200 provides a misaligned landing page 230 that includes a subject 232, images 234a-234e, and text 236a-236d irrelevant (e.g., semantically misaligned) to the digital message 206. For example, instead of displaying components that relate to "Clothing Store's Annual Christmas Sale," the misaligned landing page 230 displays information pertinent to "the spring collection," as illustrated by the image 234a.

The digital misalignment system 118 can periodically monitor the external digital content corresponding to the message link 214. For instance, at a first time period, the digital misalignment system 118 can extract a first set of semantic external digital content features from the aligned landing page 220 and compare the first set of semantic external digital content features with semantic message features extracted from the digital message 206 (i.e., to determine that the two are aligned). Similarly, for a second time period, the digital misalignment system 118 can extract a second set of semantic external digital content features from the misaligned landing page 230 and compare second set of semantic external digital content features with the semantic message features (i.e., to determine a semantic misalignment). Upon identifying a semantic misalignment corresponding to the misaligned landing page 230, the digital misalignment system 118 can notify a publisher and resolve the misalignment.

Although FIG. 2C illustrates a misaligned landing page that includes new content corresponding to a new sale, a misaligned digital link can manifest in a variety of different forms. For example, a publisher can delete a webpage or document, causing an error message to display upon selection of a digital link in a digital message. Similarly, a publisher can modify a webpage, which causes redirection to a domain root or other irrelevant source. Regardless of the type of misalignment, however, the digital misalignment system 118 can identify the misalignment, notify a publisher, and resolve the issue.

Figure 3A:
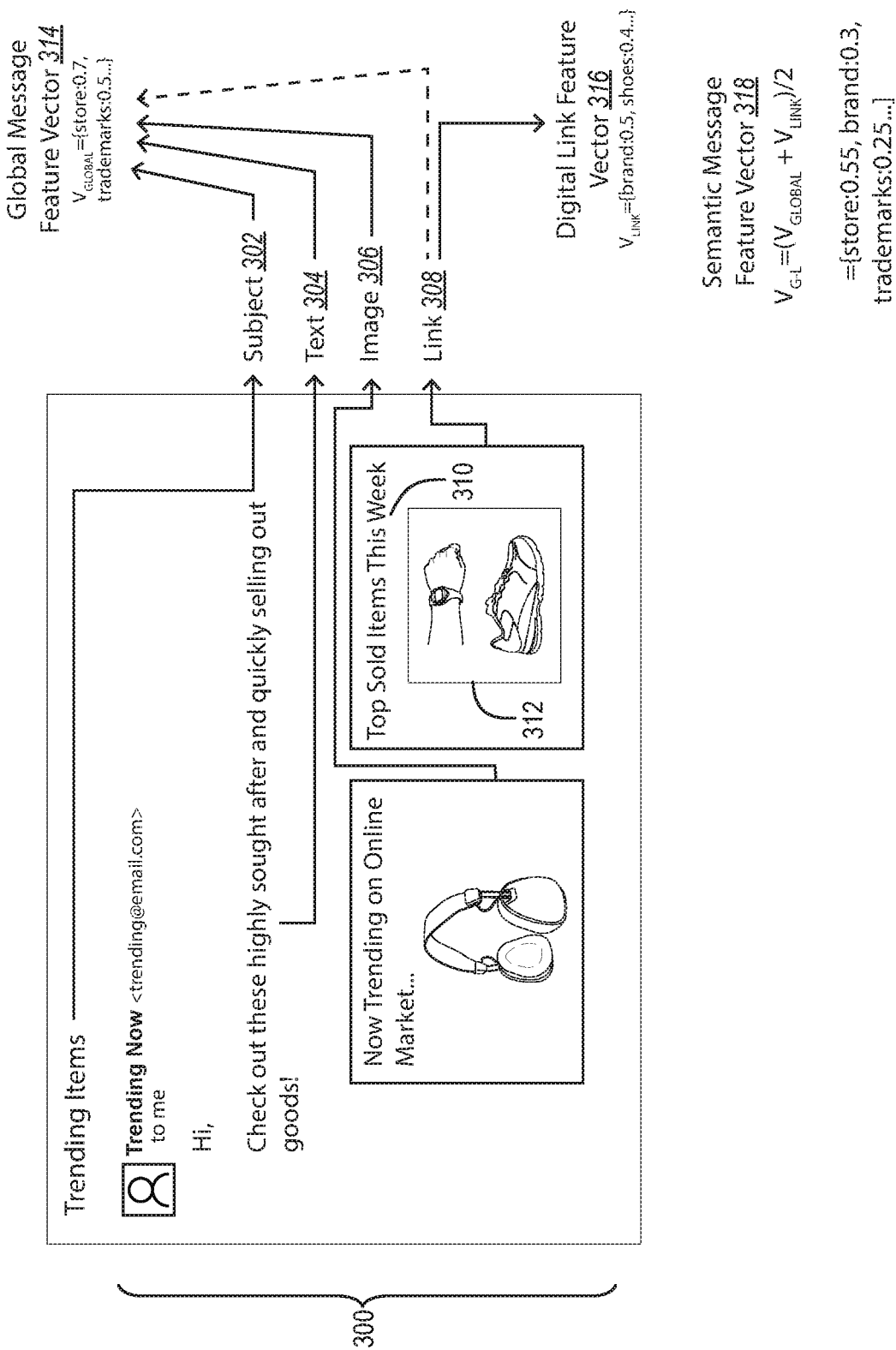
FIGS. 3A-3C illustrate extracting and comparing message vectors and external digital content vectors in accordance with one or more embodiments.
Figure 3B:
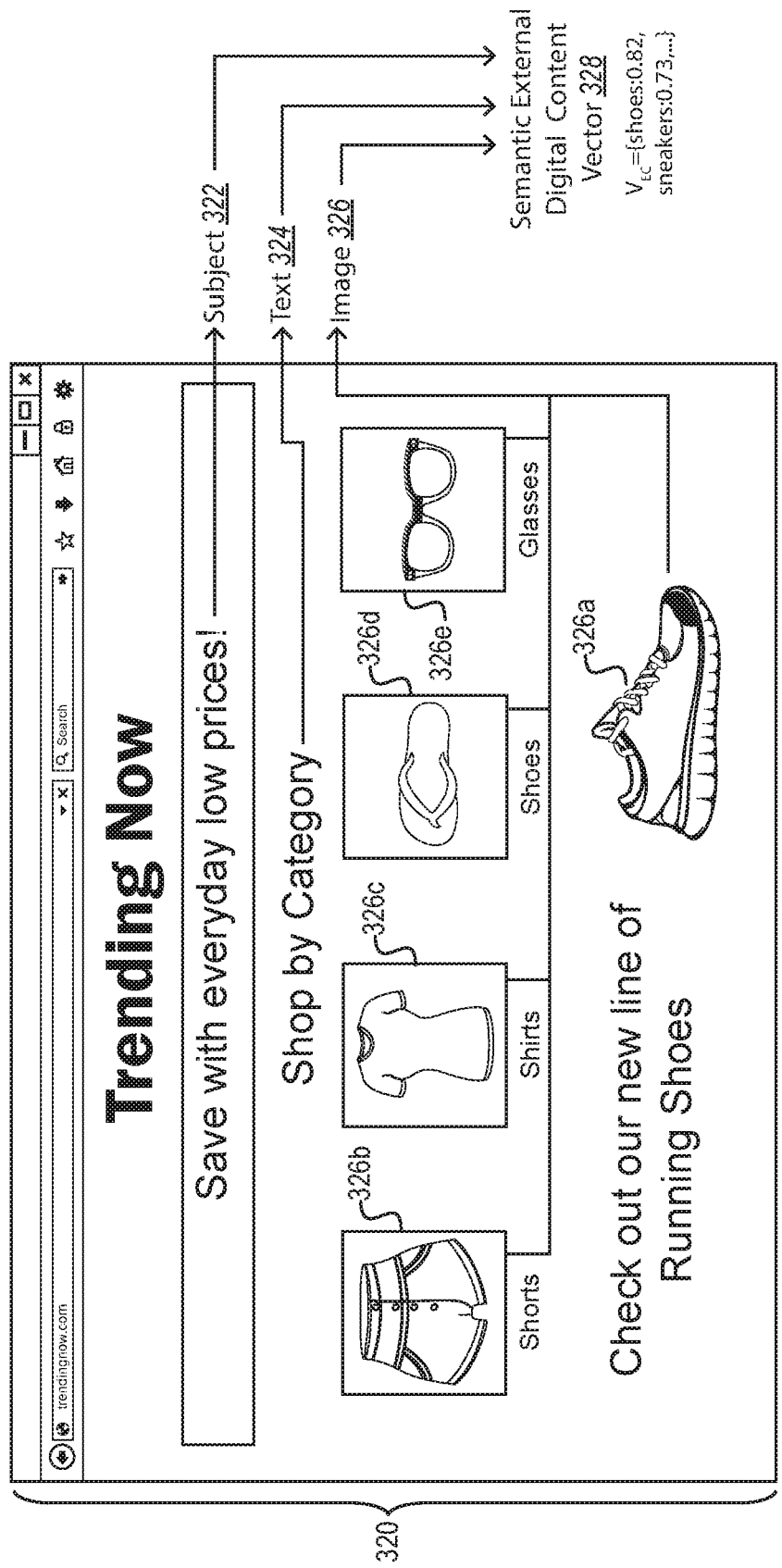
Figure 3C:
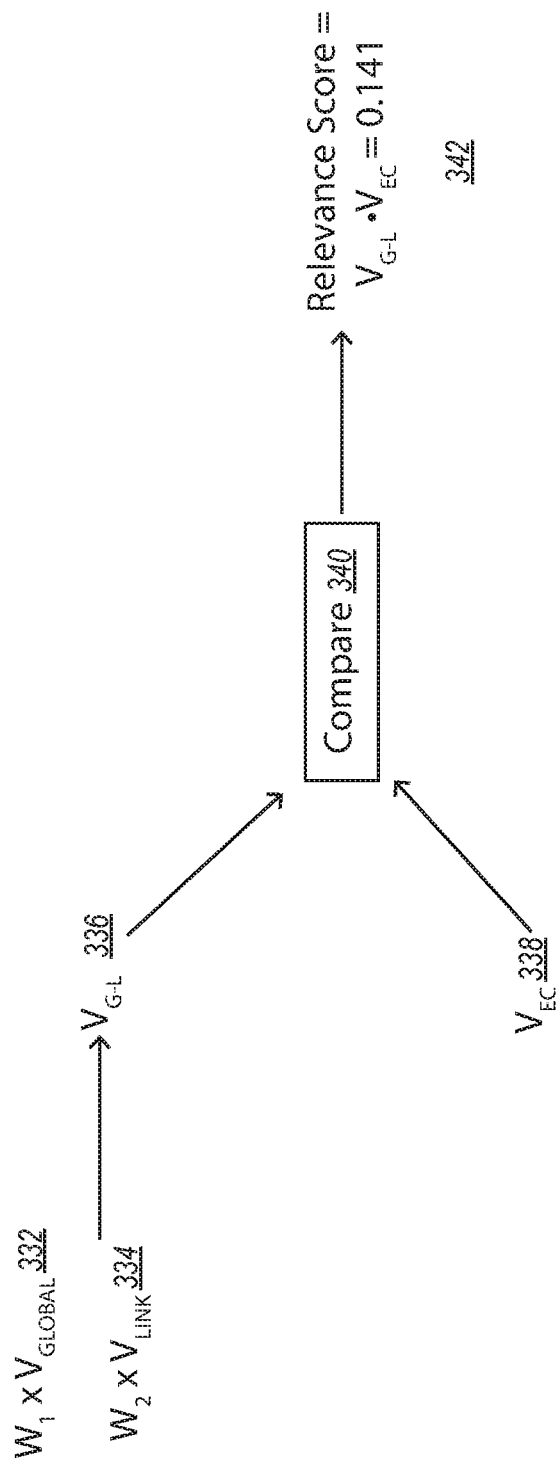

Indeed, as discussed above, the digital misalignment system 118 can identify digital misalignments by comparing features of digital messages and external digital content. For example, FIGS. 3A-3C illustrate extracting and comparing semantic message features and semantic external digital content features in accordance with one or more embodiments. In particular, FIG. 3A illustrates the digital content campaign system generating a semantic message feature vector based on extracted message components and digital link components. FIG. 3B illustrates generating an external digital content vector based on text and images within external digital content. FIG. 3C illustrates comparing the digital message vector with the semantic external digital content feature vector to determine a relevance score.

Specifically, FIG. 3A illustrates a digital message 300 that includes a message subject 302, message text 304, a message image 306, and a message link 308. In relation to the embodiment of FIG. 3A, the digital misalignment system 118 extracts digital message vectors from the digital message 300. Specifically, the digital misalignment system 118 extracts the following digital message elements from the digital message 300: the message subject 302, the message text 304, and the message images 306. Moreover, the digital misalignment system 118 extracts features from the digital message context around the message link 308. The digital misalignment system 118 may use different methods to extract semantic message features from the digital message 300. For example, in at least one embodiment, the digital misalignment system 118 extracts text, images, and links from HTML content of the email and generates feature vectors.

As illustrated by FIG. 3A, the digital misalignment system 118 may directly extract text features from the digital message 300. More specifically, the digital misalignment system 118 may generate vectors from text found in message subject 302, message text 304, and/or link text 310. The digital misalignment system 118 may utilize different methods to generate feature vectors based on text. For example, in at least one embodiment, the digital misalignment system 118 may create a Term Frequency-Inverse Document Frequency (TF-IDF) vector. Term frequency-inverse document frequency refers to a method used to generate a numerical statistic intended to reflect how important a word is to a document in a collection. In other words, the digital misalignment system 118 may use TF-IDF to represent text as a vector. Additionally, the digital misalignment system 118 may utilize word embedding, word2vec, machine-learning, and other methods to generate vectors based on the text.

The digital misalignment system 118 can also use ground-truth examples to guide and test a machine-learning model (e.g., word2vec or other models) for generation of semantic message feature vector. In particular, the digital misalignment system 118 can generate test semantic message feature vectors from the text, images, and general document structure of ground-truth training digital messages. The digital misalignment system 118 accesses known outcomes for the ground-truth examples and compares the generated semantic message feature vectors with the known outcomes. Based on the comparison, the digital misalignment system 118 adjusts parameters, weights, and/or features of the machine-learning model to more accurate generate semantic feature vectors based on text, images, and document structure.

As further illustrated by FIG. 3A, the digital misalignment system 118 may also extract image features from the digital message 300. In at least one embodiment, the digital misalignment system 118 generates vectors from the message image 306 and/or a message link image 312. In particular, the digital misalignment system 118 may utilize optical character recognition (OCR) to extract textual information from the images. The digital misalignment system 118 may further utilize word embedding, word2vec, and other methods to generate vectors based on text found in images. For example, as illustrated in FIG. 3A, the digital misalignment system 118 may use OCR to extract the text "Now trending on Online Market" from the message image 306 and the words "Top Sold Items This Week" from the message link 308. The digital misalignment system 118 will then generate vectors based on the extracted image text.

The digital misalignment system 118 also extracts semantic image features from other visual information found in the digital message 300. In particular, the digital misalignment system 118 may utilize methods to identify key objects found in the message image 306 and the message link 308. The digital misalignment system 118 may extract information regarding an image's semantic features by using alternative text (Alt Text or Alt Tag) found within the image or other image recognition methods. For example, in at least one embodiment, the digital misalignment system 118 utilizes an image recognizer (e.g., object recognition or object classifier, such as a neural network classifier) to identify key objects found in images. As illustrated in FIG. 3A, the digital misalignment system 118 identifies headphones in the message image 306 and a watch and shoe in the message link image 312. Based on these identified objects, the digital misalignment system 118 can generate one or more vectors.

In addition to extracting message link features from text and images found in message link 308, the digital misalignment system 118 may also extract additional link features. Specifically, the digital misalignment system 118 may extract semantic context around the digital link to more efficiently and effectively determine if the digital link is misaligned. For example, the digital misalignment system 118 can utilize similar approaches discussed above (e.g., OCR and/or image recognition APIs) to determine features from digital link images. Similarly, the digital misalignment system 118 can utilize approaches discussed above (e.g., TF-IDF or word2vec) to generate feature vectors from text of a link (or text surrounding a link within a threshold number of characters). The digital misalignment system 118 can also analyze the digital link itself. For example, the digital misalignment system 118 can extract the link URL (e.g., www.clothingstore.com/christmassale) as part of determining link features.

As illustrated in FIG. 3A, the digital misalignment system 118 combines features from digital message elements to create a global message feature vector 314. As used herein, the term "global message feature vector" refers to characteristics or traits of a digital message. Namely, the digital misalignment system 118 extracts global message features (i.e., a combination of features extracted from the message subject 302, the message text 304, the message image 306, and the message link 308) to create the global message feature vector 314. In some embodiments, the global message feature vector may not include feature from the message link 308.

As further illustrated in FIG. 3A, the digital misalignment system 118 also generates a digital link feature vector 316 based on features extracted from the link text 310, the message link image 312, and the message link 308. Specifically, the digital misalignment system 118 generates a separate feature vector reflecting the document structure corresponding to the digital link itself (rather than the global digital message as a whole).

In relation to FIG. 3A, the digital misalignment system 118 utilizes the global message feature vector 314 and the digital link feature vector 316 to generate a semantic message feature vector 318. In particular, the digital misalignment system 118 generates the semantic message feature vector 318 by combining the global message feature vector 314 and the digital link feature vector 316. Specifically, the digital misalignment system 118 combines the vectors by applying weights. In relation to FIG. 3A, the digital misalign system 118 applies equal weights to the global message feature vector 314 and the digital link feature vector 316. For example, the digital misalignment system 118 combines the vectors utilizing the following algorithm $(V_{link}+V_{email})/2$.

In at least one embodiment, the digital misalignment system 118 applies varying weights to the digital link feature vector 316 and the global message feature vector 314. The digital misalignment system 118 can apply varying equations to apply more or less weight to the digital link feature vector 316 relative to the global message feature vector 314 (e.g., 1.5:1, 2:1, 3:1 or vice versa). Additionally, in one or more embodiments, the digital misalignment system 118 weights the digital link feature vector 316 proportional to its volume or size in the entire digital message 300 (e.g., weight based on the length of the vectors, based on the number of features extracted, or based on the length of text within the digital link relative to the rest of the digital message). Regardless of the particular weights, the digital misalignment system 118 can generate feature vectors specific to individual structures within a digital message (e.g., the digital link) and then adjust the feature vectors based on the structure within the digital message (e.g., to emphasize context around the digital link in identifying a semantic misalignment).

While FIG. 3A illustrates generating the semantic message feature vector 318 from the digital message 300, FIG. 3B illustrates the digital misalignment system 118 generating a semantic external digital content feature vector 328 from external digital content (i.e., a landing page 320). As shown, the landing page 320 includes landing page elements including a landing page subject 322, landing page text 324, and landing page images 326a-326e.

Using methods similar to those disclosed in FIG. 3A, the digital misalignment system 118 extracts text features from the landing page 320. More specifically, the digital misalignment system 118 may directly extract text features from the landing page subject 322 and the landing page text 324. As discussed above, the digital misalignment system 118 may utilize TF-IDF, word embedding, word2vec, or other methods to generate vectors based on the landing page text.

Additionally, the digital misalignment system 118 extracts image features from the landing page images 326a-326e. In at least one embodiment, the digital misalignment system 118 may utilize OCR to extract any textual information from the images. The digital misalignment system 118 may also utilize word embedding, word2vec, and other methods to generate vectors based on text found in images. In at least one embodiment, the digital misalignment system 118 uses Alt Text or Alt Tag technology to extract information regarding an image's semantic features. Alt text or alt tag utilize words or phrases inserted as an attribute in an HTML document to indicate the nature or contents of an image. For instance, in web pages that do not load properly, the alt text appears in a blank box that would normally contain an image. For example, the alt text associated with the landing page image 326a as illustrated in FIG. 3B may be "athletic shoe." In at least one embodiment, the digital misalignment system 118 may retrieve the alt text or alt tag associated with an image on the landing page 320. The digital misalignment system 118 may identify semantic features utilizing the alt text of an image.

Based on features extracted from the landing page subject 322, the landing page text 324, and the landing page image(s) 326b-326a, the digital misalignment system 118 generates a semantic external digital content feature vector 328. Although not illustrated, the digital misalignment system 118 can also generate feature vectors specific to structure of the external digital content. For example, similar to FIG. 3A, the digital misalignment system 118 can also generate a feature vector specific to the title, the subject, or a first portion (e.g., the first paragraph of text or a first paragraph of text and a first image) of the landing page 320. The digital misalignment system 118 can also combine (e.g., weight) different vectors (e.g., a global external content vector with a title feature vector) to generate the semantic external digital content feature vector 328.

The digital misalignment system 118 can use ground-truth examples to guide and test a machine-learning model utilized to generate the semantic external digital content feature vector 328. As described above with respect to FIG. 3A, the digital misalignment system 118 can thus generate the semantic external digital content feature vector 328 using ground-truth examples.

As mentioned above, upon identifying semantic feature vectors for a digital message and external digital content, the digital misalignment system 118 can identify a relevance score. For example, FIG. 3C illustrates generating a relevance score 342 in accordance with one or more embodiments. As illustrated in FIG. 3C, to generate the relevance score 342, the digital misalignment system 118 combines the global message feature vector 332 with the digital link feature vector 334 to generate the semantic message feature vector 336. The digital misalignment system 118 then compares 340 the semantic message feature vector 336 with semantic external digital content feature vector 338 to generate the relevance score 342.

As illustrated by FIG. 3C, and as previously discussed with regard to FIG. 3A, the digital misalignment system 118 may accord different weights to the global message feature vector 332 and the digital link feature vector 316 to generate the semantic message feature vector 336. While in at least one embodiment, the digital misalignment system 118 may accord the global message feature vector 332 and the digital link feature vector 316 equal weight, in at least one other embodiment, the digital misalignment system 118 can more heavily weight one or the other. For example, the publisher may choose to give more weight to the global message feature vector 332. Therefore, the digital misalignment system 118 might increase the value of weight variable $W_1$ and decrease the value of weight variable $W_2$ as illustrated in FIG. 3C.

As illustrated in FIG. 3C, once the semantic message feature vector 336 and the semantic external digital content feature vector 338 have been generated, the digital misalignment system 118 compares 340 the vectors to calculate the relevance score 342. In particular, the digital misalignment system 118 can compare the semantic message feature vector 336 and the semantic external digital content feature vector 338 within a semantic features space to generate the relevance score 342. The digital misalignment system 118 can utilize a variety of different approaches to compare the semantic message feature vector 336 and the semantic external digital content feature vector 338. For example, in one or more embodiments, the digital misalignment system 118 uses cosine similarity of two vectors to compare 340 the semantic message feature vector 336 and the semantic external digital content feature vector 338. The digital misalignment system 118 can also utilize a Euclidean distance, squared Euclidean distance, or other similarity measure.

Upon generating the relevance score 342, the digital misalignment system 118 can utilize the relevance score 342 to determine a semantic misalignment. For example, the digital misalignment system 118 can compare the relevance score 342 to a relevance score threshold. As used herein, "relevance score threshold" refers to a qualifying score associated with a classification. In particular, the relevance score threshold includes a relevance score value determined by the publisher or the digital misalignment system 118 that is associated with identification of a semantic misalignment. If the relevance score 342 fails to satisfy the relevance score threshold (e.g. falls below the relevance score threshold), the digital misalignment system 118 can identify a semantic misalignment.

As just discussed, FIGS. 3A-3C illustrate identifying a semantic misalignment in accordance with one or more embodiments. Accordingly, FIGS. 3A-3C and the corresponding description and algorithms can provide structure for a step for identifying a semantic misalignment between a digital link and external digital content.

As mentioned above, the digital misalignment system 118 assists in identifying and resolving semantic misalignments in executing digital content campaigns. In particular, FIGS. 4A-4C illustrate graphical user interfaces generated by the digital misalignment system 118 in accordance with one or more embodiments for identifying and resolving semantic misalignments between digital messages and external digital content in a digital content campaign.

Figure 4A:
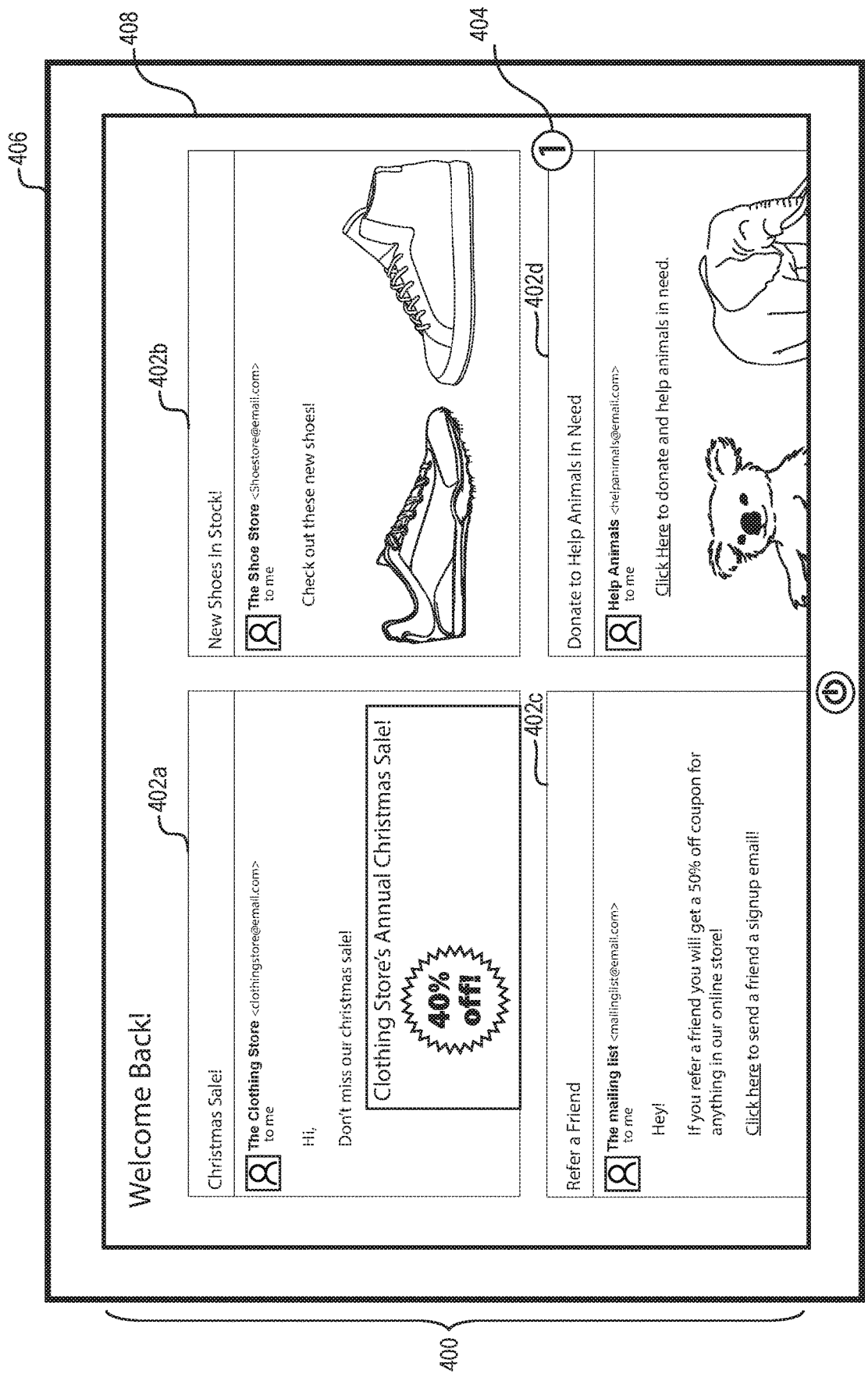
Figure 4B:
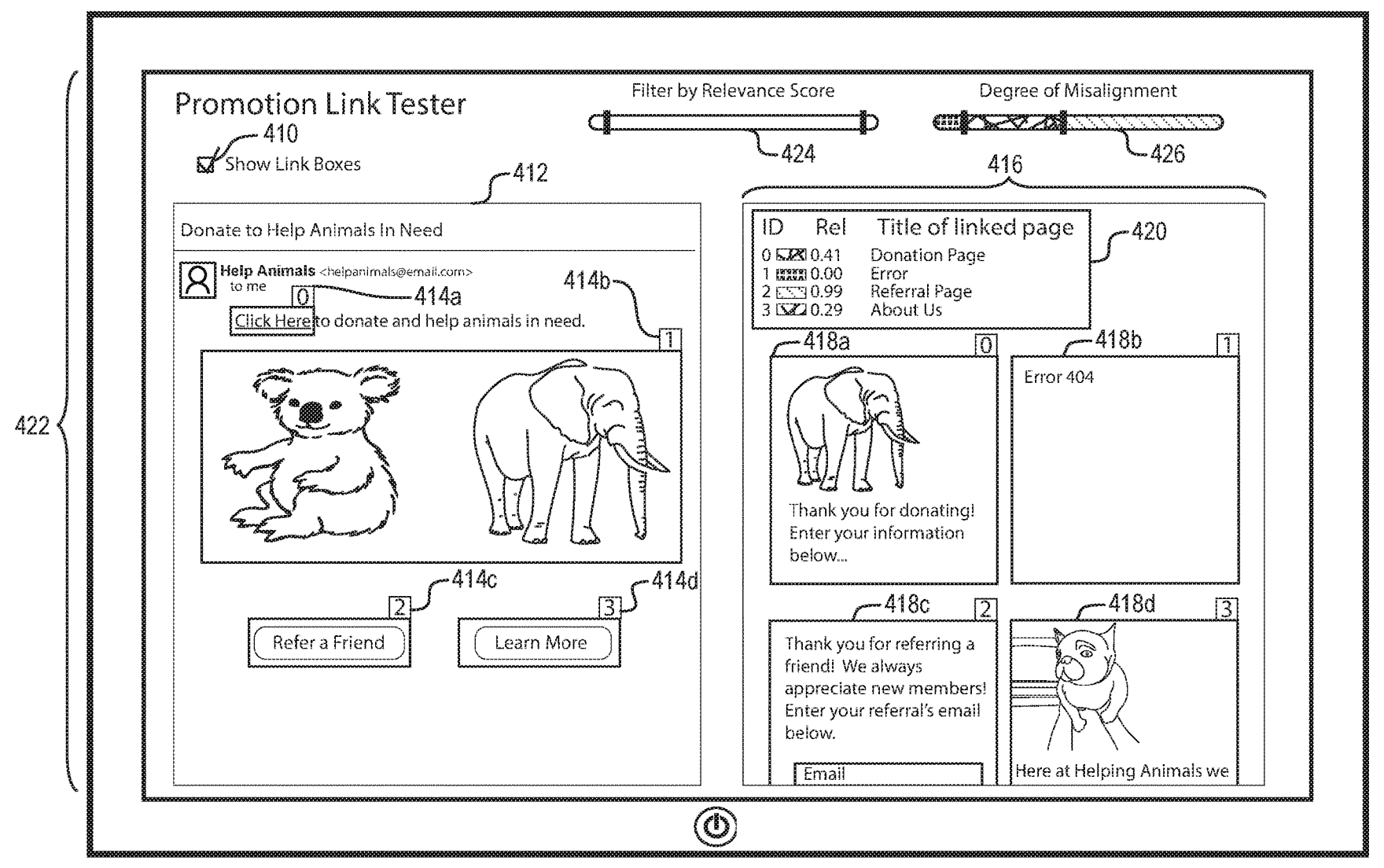
Figure 4C:
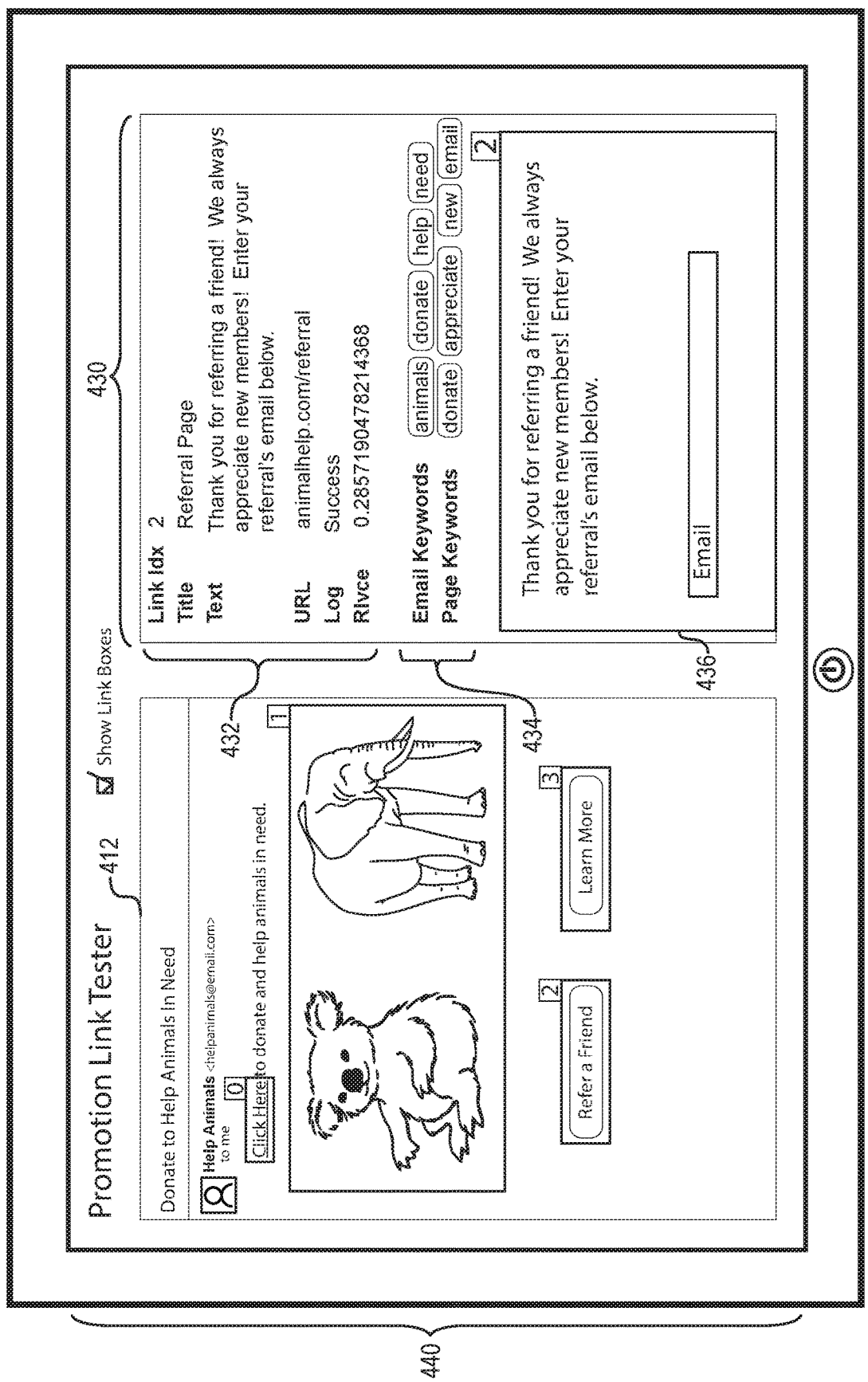

Specifically, FIG. 4A illustrates a graphical user interface 400 by which a publisher of a digital content campaign can manage one or more digital content campaigns. Specifically, FIG. 4A illustrates a publisher computing device 406 with a display screen 408 providing for display the graphical user interface 400. The graphical user interface 400 corresponds to a publisher application (e.g., the publisher application 116) that allows a publisher to manage various aspects of a digital content campaign, including transmitting digital messages for the campaign and/or executing the campaign by sending the digital messages to one or more users.

FIG. 4A illustrates a list of digital messages that have been registered to the digital misalignment system 118. As illustrated in FIG. 4A, the graphical user interface 400 provides a plurality of options that allow the publisher to view and/or select one or more digital messages (e.g., the digital message 300). For instance, the graphical user interface 400 includes a plurality of digital messages 402a-402d previously generated and/or transmitted by the publisher together with a misalignment notification 404. To illustrate, the graphical user interface 400 includes thumbnail images of four previously composed digital messages 402a-402d. The digital messages 402a-402d may be ordered by time sent, number of potential misalignments, relevance, or any metric as indicated by a publisher. The digital misalignment system 118 may utilize other interface elements besides a thumbnail view to display the digital messages 402a-402b. For example, in at least one embodiment, the campaign management interface may list the digital messages 402a-402b by substituting thumbnail images with text identifiers for the digital messages 402a-402b.

Additionally, FIG. 4A illustrates that the graphical user interface 400 includes the misalignment notification 404. For instance, the digital misalignment system 118 provides the misalignment notification 404 to illustrate digital messages associated with lower relevance scores (e.g., relevance scores that fall below a threshold). FIG. 4A illustrates that the digital message 402d contains "1" misalignment as indicated by the misalignment notification 404. The digital misalignment system 118 may provide notifications using various other methods and/or a combination of methods. For example, the digital misalignment system 118 may present a user interface that surrounds the digital messages 402a-402b with colored borders indicating that a particular digital message contains a misaligned link.

As mentioned above, the digital misalignment system 118 can present semantic misalignments utilizing a variety of user interfaces. For example, FIG. 4B illustrates a graphical user interface 422. In one or more embodiments, the digital misalignment system 118 provides the graphical user interface 422 for display upon after selection of a digital message from the graphical user interface 400. As illustrated in FIG. 4B, detecting the publisher's selection of the digital message 402d, the digital misalignment system 118 provides for display the graphical user interface 422 that includes a digital message display 412 and a landing pages summary 416. The digital message display 412 includes link boxes 414a-414d that illustrate links within the selected digital message. The publisher may select a "show link boxes" element 410 to include or exclude link boxes 414a-414d in the digital message display 412. Additionally, as illustrated in FIG. 4B, the link boxes are numbered in order to facilitate reference with the landing pages summary 416. Landing pages summary 416 comprises landing page thumbnails 418a-418d and linked page information 420.

In one or more embodiments, the link boxes 414a-414d may be color coded to indicate relevance score. For instance, the digital misalignment system 118 may associate certain colors with different ranges of relevance scores to indicate a degree (or likelihood) if misalignment with external digital content. For example, the digital misalignment system may color link boxes green for "good" relevance scores between 0.4 and 1 that indicate a high likelihood of being semantically aligned. The digital misalignment system 118 may color link boxes orange for "medium" relevance scores between 0.1 and 0.4. The digital misalignment system 118 may color link boxes red for "poor" relevance scores between 0 and 0.1.

As illustrated in FIG. 4B, the graphical user interface 422 includes a color code adjustment element 426. In at least one embodiment, the publisher may adjust the relevance score ranges associated with the "good," "medium," and "poor" categorizations by interacting with the color code adjustment element 426. For example, the color code adjustment element 426, as illustrated, comprises a sliding bar element. The publisher may expand the "poor" range to include links with relevance scores between 0 and 0.4. The publisher may do so dragging the "poor" sliding bar cursor to the 0.4 value or by clicking the 0.4 location on the sliding bar. Therefore, link boxes associated with relevance scores between 0 and 0.4 would all be colored red.

The landing pages summary 416 as illustrated in FIG. 4B displays external landing pages (e.g., snapshots of external landing pages) corresponding to links in the digital message shown in the digital message display 412. In particular, the landing pages summary 416 includes landing page thumbnails 418a-418d which display updated images of the linked landing pages and the linked page information 420. For example, linked page information 420 may include relevance scores and titles of linked pages. For reference, the linked page information 420 may be organized by identification numbers (e.g., "ID" numbers 0-3) corresponding to the link boxes 414 in the digital message display 412. In at least one embodiment, the publisher may select a list view that does not include the landing page thumbnails 418a-418d. Instead, in the list view, the landing pages summary 416 includes only a list similar to the list in linked page information 420.

In at least one embodiment, a publisher may choose different ordering criteria for links displayed in linked page information 420. In particular, the publisher may order links according to identification numbers, relevance score, or by title. In at least one embodiment, the publisher may choose to order the links by selecting the column headers located in the linked page information 420. For example, as illustrated in FIG. 4B, by selecting "ID," the publisher may view the links in order of ascending or descending "ID" numbers. Likewise, by selecting the "Rel" or linked "Title of linked page" headers, the publisher may view the links in order of ascending or descending relevance score or linked page title, respectively.

As illustrated by FIG. 4B, the graphical user interface 422 also includes a relevance score filter element 424. The publisher may select, for display in the landing pages summary 416, information for a limited set of linked pages based on relevance score. In particular, the publisher may select a range of relevance scores to be displayed in the landing pages summary 416 by adjusting the upper limit (e.g., highest relevance score) and the lower limit (e.g., lowest relevance score) to be displayed. The relevance score filter element 424 comprises an interactive sliding bar with a selectable lower limit cursor and a selectable upper limit cursor. A publisher may select an upper limit by sliding an upper limit cursor and/or select a lower limit by sliding a lower limit cursor on the relevance score filter element 424. For example, the publisher may choose to selectively view (e.g., filter) linked page information for pages with a low relevance score (i.e., high likelihood of semantic misalignment) between 0 and 0.3 by dragging an upper limit relevance score cursor to the 0.3 position on the relevance score filter element 424 sliding bar. In response to the publisher input, and as illustrated in FIG. 4B, the landing pages summary 416 would display only linked page information associated with link "1" and link "3," which both have relevance scores between 0 and 0.3. In particular, landing pages summary would include only landing page thumbnails 418b (associated with link 1) and 418d (associated with link 3) as well as link information for link 1 and link 3 in linked page information 420.

In at least one embodiment, the publisher may set a relevance score parameter comprising a set difference between the upper limit value and the lower limit value using the relevance score filter element 424. The publisher may slide the parameter to include a higher or lower range of relevance scores but with the same set difference between the original upper limit value and the original lower limit value. For example, the publisher may set a relevance score parameter comprising a difference of 0.5 by moving the lower limit cursor to 0.3 and moving the upper limit to 0.8. The publisher may select any point between the lower limit cursor and the upper limit cursor and drag the parameter to include a higher range (e.g., 0.5 to 1.0) or to include a lower range (e.g., 0 to 0.5).

Linked page information 420 may also include color codes that correspond to the color codes discussed above with respect to the link boxes 414a-414d. For example, as discussed above, the graphical user interface 422 may use the colors green, orange, and red to indicate relevance score range. In at least one embodiment, the linked page information 420 may include a colored bar that corresponds to the link box color. In at least one other embodiment, the text of the linked page information may be colored.

In at least one embodiment, the digital misalignment system 118 can provide an additional graphical user interface for display that includes additional information regarding one or more links. For example, as illustrated in FIG. 4C, the publisher may select one particular link and, in response, the digital misalignment system 118 can generate a graphical user interface 440 to display information regarding the selected linked page. For example, the publisher may select one of the link boxes 414a-414d, one of the landing page thumbnails 418a-b, or a link within linked page information 420 and, in response, the digital misalignment system 118 can generate the graphical user interface 440.

As shown in FIG. 4C, the graphical user interface 440 includes the digital message display 412 as well as a landing page summary 430. The landing page summary 430 includes landing page information 432, a keyword element 434, and a landing page display 436.

As illustrated in FIG. 4C, the graphical user interface 440 includes landing page information 432 specific to one single landing page. In particular, and as illustrated, the landing page information 432 includes information such as the link identification number (e.g., "Link Idx"), the landing page title, text found on the landing page, the link URL, whether or not the landing page was reachable (e.g., "Log"), and the link relevance score. In one or more other embodiments, landing page information 432 may include additional data pertaining to the landing page (or additional selected landing pages).

The keyword element 434 enables publishers to quickly identify keywords from external digital content (e.g., "Page Keywords") and keywords from the digital message (e.g., "Email Keywords"). In addition to presenting individual keywords found in the linked page and the digital message, the digital misalignment system 118 may also highlight words that overlap between the digital message and the linked page. For example, as illustrated in FIG. 4C, both the "Email Keywords" and "Page Keywords" include the keyword "donate." Therefore, the digital misalignment system 118 may highlight "donate" by coloring the word green. Other keywords that are present in either the digital message or the external digital content, but not in both, remain unhighlighted. In at least one embodiment, keywords that do not appear in both are colored gray. Thus, the keyword element 434 enables publishers to quickly identify keywords shared by both the digital message and the linked external digital content.

Accordingly, as mentioned above, the digital misalignment system 118 can improve the efficiency and speed of identifying and resolving semantic misalignments. The digital misalignment system 118 can provide graphical user interfaces 400, 422, and 440, which display information pertinent to identifying and resolving a semantic misalignment. For example, the digital misalignment system 118 allows publishers to directly access digital messages via the digital message display 412, the landing page thumbnails 418a-418d, relevance scores, and other information without needing to select multiple links, open multiple windows, and analyze the associated landing pages for semantic misalignments. Not only does the digital misalignment system 118 improve the speed with which publishers may review landing pages, the digital misalignment system 118 also improves efficiency by illustrating which links in a digital message likely contain semantic misalignments (e.g., using the misalignment notification 404 and the color-coded link boxes 414a-414d).

Figure 5:
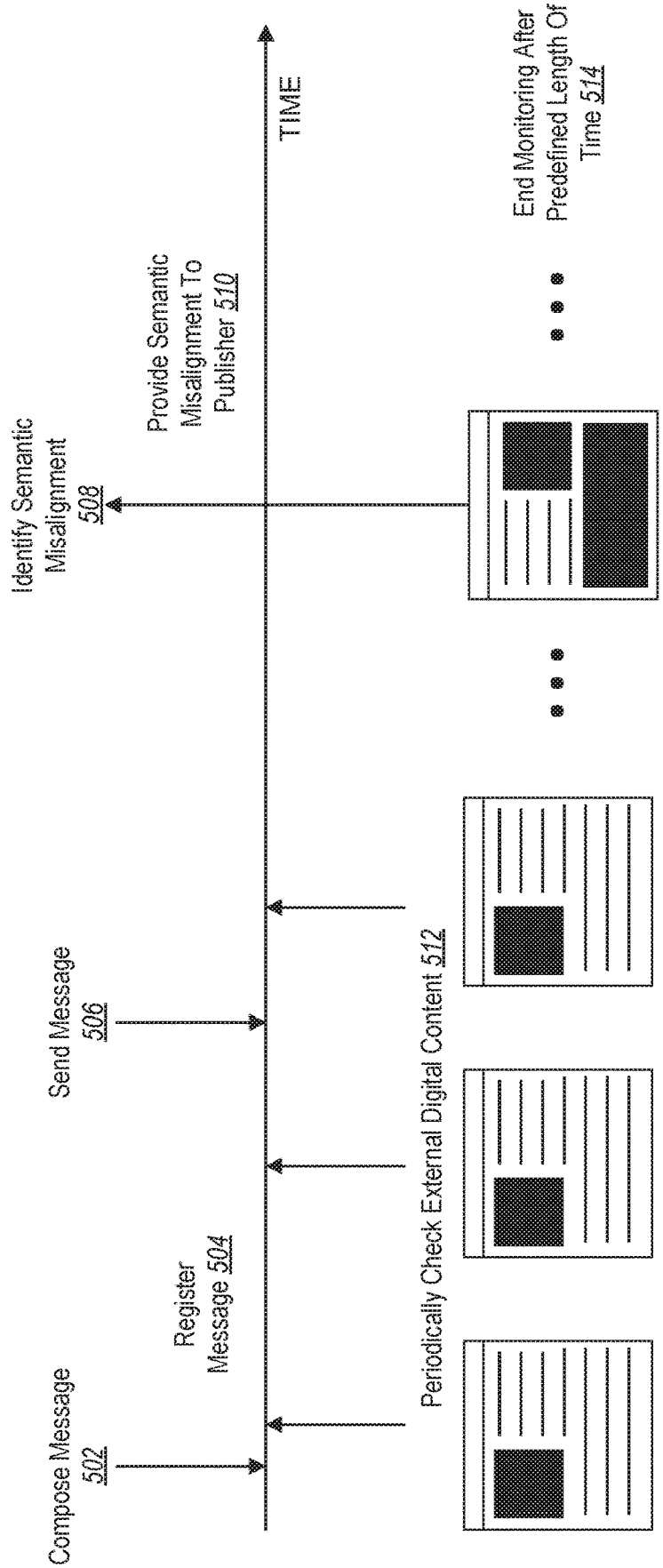
FIG. 5 illustrates a timeline of the digital misalignment system in accordance with one or more embodiments.

As mentioned above, in one or more embodiments, the digital misalignment system 118 periodically monitors external digital content to identify semantic misalignments that develop over time. For example, FIG. 5 illustrates a timeline of the digital misalignment system 118 performing acts 502-514 in accordance with one or more embodiments. In particular, FIG. 5 illustrates that the digital misalignment system 118 periodically checks the external digital content after the digital message has been composed and sent until the digital misalignment system ends the monitoring period. FIG. 5 also illustrates reporting (significant) misalignments to the publisher after a misalignment has been found.

As illustrated by FIG. 5, at any point after composing the digital message 502, the publisher may perform the act 504 of registering a message to the digital misalignment system 118. Registering a digital message to the digital misalignment system 118 may include sending the digital message to the digital misalignment system 118 via the publisher application 116 on the publisher client device 104. For example, a publisher can upload an email to a campaign management tool to search for potential semantic misalignments. When the publisher registers the message to the digital misalignment system 118, the digital misalignment system 118 extracts semantic message features and digital link features from the text, images, and links from the digital message.

As shown in FIG. 5, the digital misalignment system 118 can also perform the act 512 of periodically checking external digital content. In particular, at preset time intervals, the digital misalignment system 118 identifies links within the digital message and and/or retrieves the linked external digital content. In at least one embodiment, the digital misalignment system 118 retrieves snapshots of landing pages and compares semantic landing page features with semantic message features and link features. The digital misalignment system 118 compares the semantic message features with the semantic external digital content features by calculating relevance scores. At each interval, the digital misalignment system 118 determines whether the relevance scores meet a certain threshold. The intervals at which the digital misalignment system 118 checks the external landing page may be determined and entered into the digital misalignment system 118 by the publisher via the publisher application 116 located on the publisher client device 104. In at least one embodiment, the digital misalignment system 118 sets the interval as one day and checks the external digital content once daily.

As shown in FIG. 5, the digital misalignment system 118 may dynamically monitor the external digital content to identify digital misalignments. For example, the digital misalignment system 118 may check the external digital content during an initial time period before the digital message is sent. The digital misalignment system 118 may also check the external digital content during a first time period after the digital message has been sent. Moreover, the digital misalignment system 118 can also check the external digital content during a second (and/or third, fourth, fifth) time period after the digital message has been sent. By dynamically monitoring external digital content at the initial time period before the digital message is sent, the first time period after the digital message has been sent, and/or the second time period after the digital message has been sent, the digital misalignment system 118 can identify misalignments when digital messages are created (or registered) and also as digital misalignments arise over time after transmission of the digital message to user client devices.

The digital misalignment system 118 can use different methods to automatically determine time intervals (or periods) for checking external digital content. In particular, the digital misalignment system 118 can access publisher characteristics, digital message characteristics, and/or external digital content characteristics to determine an appropriate time interval. For example, the digital misalignment system 118 may consider how often a publisher sends digital messages, the number of links within digital message, the time sensitivity of the digital message contents, and/or the frequency of external digital content updates.

Additionally, as part of periodically checking external digital content, the digital misalignment system 118 can capture landing page snapshots. For example, the digital misalignment system 118 can capture landing page snapshots for utilization in providing user interfaces (such as the graphical user interfaces 400, 422, 440).

As illustrated in FIG. 5, the digital misalignment system 118 (or a separate third party system) can perform the act 506 of sending the digital message. For example, the act 506 can include a publisher client device (e.g., an email server) sending a digital message which has been registered to the digital misalignment system 118. In particular, the publisher client device can send a digital message associated with a digital content campaign to one or more message recipients. For example, the digital message may comprise an email. As illustrated, even after the message has been sent, the digital misalignment system 118 continues to perform the act 512 of periodically checking the external digital content.

As shown in FIG. 5, the digital misalignment system 118 performs the act 508 of identifying a semantic misalignment. For example, the digital misalignment system 118 can include determining that the relevance score meets a certain threshold. The threshold may be predetermined by the digital misalignment system. Alternatively, the publisher may determine the threshold. In either case, the act 508 can include identifying that the relevance score has been satisfied. As illustrated in FIG. 5, the digital misalignment system 118 may find a misalignment after the message has already been sent. For example, as the digital misalignment system 118 periodically checks the external digital content after the message has been sent, the digital misalignment system 118 may identify a misalignment.

As illustrated in FIG. 5, the digital misalignment system 118 also performs the act 510 of providing semantic misalignments to a publisher. In particular, the act 510 can include generating and providing reports of significant misalignments to the publisher client device. Specifically, the act 510 includes sending, to the publisher client device, a message reporting that a significant misalignment has been found for digital messages (e.g., the relevance score between external digital content and the digital message has met a threshold). For example, the message may comprise an email to the publisher, a notification via the publisher application 116 located on the publisher client device or use any other communication system to notify the publisher. In at least one embodiment, the notification to the publisher includes one of the graphical user interfaces 400, 422, or 440.

In at least one embodiment, the act 510 can include sending messages only for misalignments that have not been previously reviewed. If the digital misalignment system 118 determines that the publisher has already reviewed a particular misalignment in a digital message, the digital misalignment system 118 may determine not to send a second message for the same misalignment. The digital misalignment system 118 may determine that a misalignment has been reviewed based on a number of indicators. One indicator may include determining that a message reporting the same misalignment has previously been sent. Another indicator includes determining that the publisher has previously accessed and interacted with the graphical user interface illustrated in FIGS. 4A-4C. For example, if the digital misalignment system 118 detects that the publisher selected the landing page snapshot associated with a link with a significantly lower relevance score, the digital misalignment system 118 may determine not to send another notification reporting the same misalignment.

As shown in FIG. 5, the digital misalignment system 118 also performs the act 514 of ending monitoring (after a predefined length of time). The act 514 can include terminating checking the external digital content for misalignments. The predefined length of time may be automatically determined by the digital misalignment system 118. For example, the digital misalignment system 118 may consider previous lengths of time set by the publisher, the urgency of the digital message, and/or an anticipated date/time for an external digital content update. Alternatively, the publisher can determine and enter the predefined length of time via the publisher application 116. For example, the publisher may determine to end checking misalignments for a Christmas promotional email at the beginning of the new year. Therefore, the digital misalignment system 118 would periodically check the external digital content associated with the Christmas promotional email until the beginning of the new year.

In at least one embodiment, part of ending monitoring after a predefined length of time 514 includes removing (e.g., unregistering) the digital message (e.g., so that the message is no longer included in the graphical user interface 400, 422, or 440). In at least one other embodiment, the digital misalignment system 118 will not remove the digital message (e.g., from the graphical user interface 400) until reaching a maximum number of digital messages (e.g., until the list of digital messages in the graphical user interface 400 exceeds a maximum threshold number).

Figure 6:
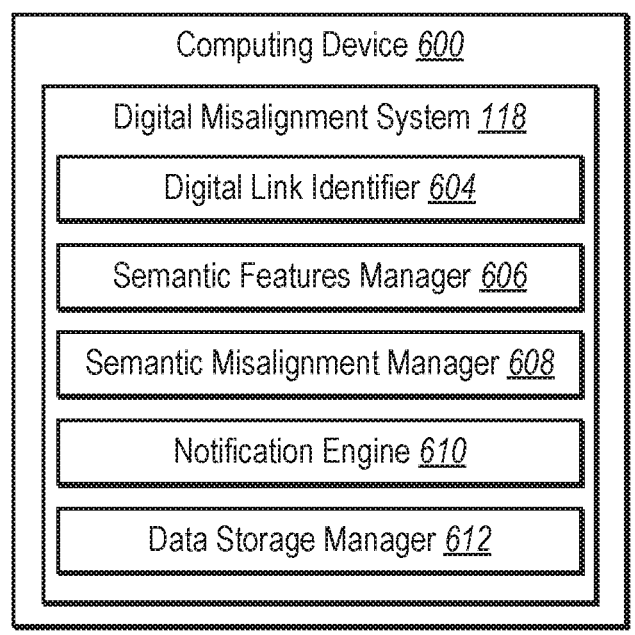
FIG. 6 illustrates a schematic diagram of the digital misalignment system of FIG. 1 in accordance with one or more embodiments.

FIG. 6 illustrates a schematic diagram of an embodiment of the digital misalignment system 118. As shown, the digital misalignment system 118 can be part of computing device(s) 600. Additionally, the digital misalignment system 118 can include, but is not limited to a digital link identifier 604, a semantic features manager 606, a semantic misalignment manager 608, a notification engine 610, and a data storage manager 612. The digital misalignment system 118 can be implemented on any number of computing devices (e.g., the server device(s) 112 and/or the publisher client device 104 of FIG. 1). For example, the digital misalignment system 118 can be implemented as part of the campaign management system 102 in a distributed system of server devices for managing digital content campaigns for sending electronic messages such as emails to a plurality of client devices of a plurality of users. Alternatively, the digital misalignment system 118 can be implemented on a single computing device such as the publisher client device 104 of FIG. 1.

In one or more embodiments, each of the components of the digital misalignment system 118 are in communication with one another using any suitable communication technologies. Additionally, the components of the digital misalignment system 118 can be in communication with one or more other devices including the publisher client device 104, as illustrated in FIG. 1. It will be recognized that although the components of the digital misalignment system 118 are shown to be separate in FIG. 6, any of the subcomponents may be combined into fewer components, such as into a single component, or divided into more components as may serve a particular implementation. Furthermore, although the components of FIG. 6 are described in connection with the digital misalignment system 118, at least some of the components for performing operations in conjunction with the digital misalignment system 118 described herein may be implemented on other devices within the environment.

The components of the digital misalignment system 118 can include software, hardware, or both. For example, the components of the digital misalignment system 118 can include one or more instructions stored on a computer-readable storage medium and executable by processors of one or more computing devices (e.g., the computing device(s) 600). When executed by the one or more processors, the computer-executable instructions of the digital misalignment system 118 can cause the computing device(s) 600 to perform the campaign management methods described herein. Alternatively, the components of the digital misalignment system 118 can comprise hardware, such as a special purpose processing device to perform a certain function or group of functions. Additionally or alternatively, the components of the digital misalignment system 118 can include a combination of computer-executable instructions and hardware.

Furthermore, the components of the digital misalignment system 118 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital misalignment system 118 may be implemented as part of a stand-alone application on a personal computing device or a mobile device. Alternatively or additionally, the components of the digital misalignment system 118 may be implemented in any application that allows creation and delivery of marketing content to users, including, but not limited to, applications in ADOBE® ANALYTICS CLOUD, such as ADOBE® ANALYTICS, ADOBE® AUDIENCE MANAGER, ADOBE® CAMPAIGN, ADOBE®EXPERIENCE MANAGER, ADOBE® MEDIA OPTIMIZER, ADOBE® PRIMETIME, ADOBE® SOCIAL, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", "ADOBE PRIMETIME", "ADOBE SOCIAL", and "ADOBE TARGET" are registered trademarks of Adobe Systems Incorporated in the United States and/or other countries.

As shown in FIG. 6, the digital misalignment system 118 can include a digital link identifier 604. The digital link identifier 604 can identify, determine, and/or detect digital links within digital messages associated with one or more digital content campaigns. Specifically, the digital link identifier 604 can analyze digital messages, identify the presence of a digital link, and mark digital messages containing digital links for further analysis for semantic misalignment. The digital link identifier 604 can analyze digital messages that will be or have already been sent to recipients as part of a digital content campaign. For example, the digital link identifier 604 can analyze digital messages that a publisher registers with the digital misalignment system 118. The digital link identifier 604 can communicate with the data storage manager 612 to store past digital messages previously sent to recipients and new digital messages to be sent to recipients.

The digital misalignment system 118 also includes a semantic features manager 606. The semantic features manager 606 can identify, extract, determine, and/or generate semantic features of digital messages (and/or external digital content). For example, the semantic features manager 606 can extract text, images, and links from (HTML content of) a digital message. As discussed above, the semantic features manager 606 can utilize OCR and image recognition to extract features from message or link images. The semantic features facilitator may send semantic message features to data storage manager 610 for storage prior to comparison with external digital content features.

Similarly, the semantic features manager 606 can extract text, images, and links from external digital content. The semantic features manager 606 can retrieve external digital content referenced by a digital message and, as discussed, extract semantic features from the external digital content. The semantic features manager 606 may send retrieved contents the external digital content to the data storage manager 610 for storage. For example, in cases where the external digital content comprises an external landing page, the semantic features manager 606 may store snapshots of the landing page in the data storage manager 610. Additionally, the semantic features manager 606 may retrieve and store snapshots of an external landing page at set time intervals. Thus, the semantic features manager 606 may retrieve semantic external digital content features after the digital message has been sent to recipients.

As shown in FIG. 6, the digital misalignment system 118 also includes a semantic misalignment manager 608. The semantic misalignment manager 608 can determine, identify, and/or detect semantic misalignments between digital messages and external digital content. For instance, the semantic misalignment manager 608 can determine a relevance score for a digital link and corresponding snapshot of external digital content (e.g., landing page). Specifically, the semantic misalignment manager 608 compares semantic message features (e.g., a semantic message feature vector) and digital link features (e.g., digital link feature vector) with the semantic external digital content features (e.g., semantic external digital content feature vector). The semantic misalignment manager 608 may, at predetermined time intervals, compare updated semantic external digital content features with semantic external digital content features. The semantic misalignment manager 608 may also compare semantic external digital content features from the latest retrieval with the semantic external digital content features from the previous retrieval to determine whether the external digital content has undergone a significant change.

As illustrated in FIG. 6, the digital misalignment system 118 also includes the notification engine 610. The notification engine 610 can generate, create, and provide for display, one or more graphical user interfaces that include a semantic misalignment. For example, the notification engine 610 can generate a user interface that comprises potential semantic misalignments between a digital message and linked external digital content. This includes generating a user interface that the publisher may use to confirm and correct a semantic misalignment. For example, as described above, the notification engine 610 may present, to the publisher, a plurality of user interfaces that include the digital message, external digital content (e.g., landing page snapshots), and information relevant to the external digital content. Additionally, if the semantic misalignment monitor determines that there is a significant change in external digital content that lowers the relevance score, the notification engine 610 can send, to the publisher client device, an electronic message that notifies the publisher about the change.

The digital misalignment system 118 also includes a data storage manager 612 (that comprises a non-transitory computer memory) that stores and maintains data associated with digital content campaigns. For example, the data storage manager 612 can include a database that stores a plurality of past digital messages sent to each user. Specifically, the data storage manager 612 can store semantic message features. Additionally, the data storage manager 612 can store information associated with external digital content, including snapshots of landing pages.

Figure 7:
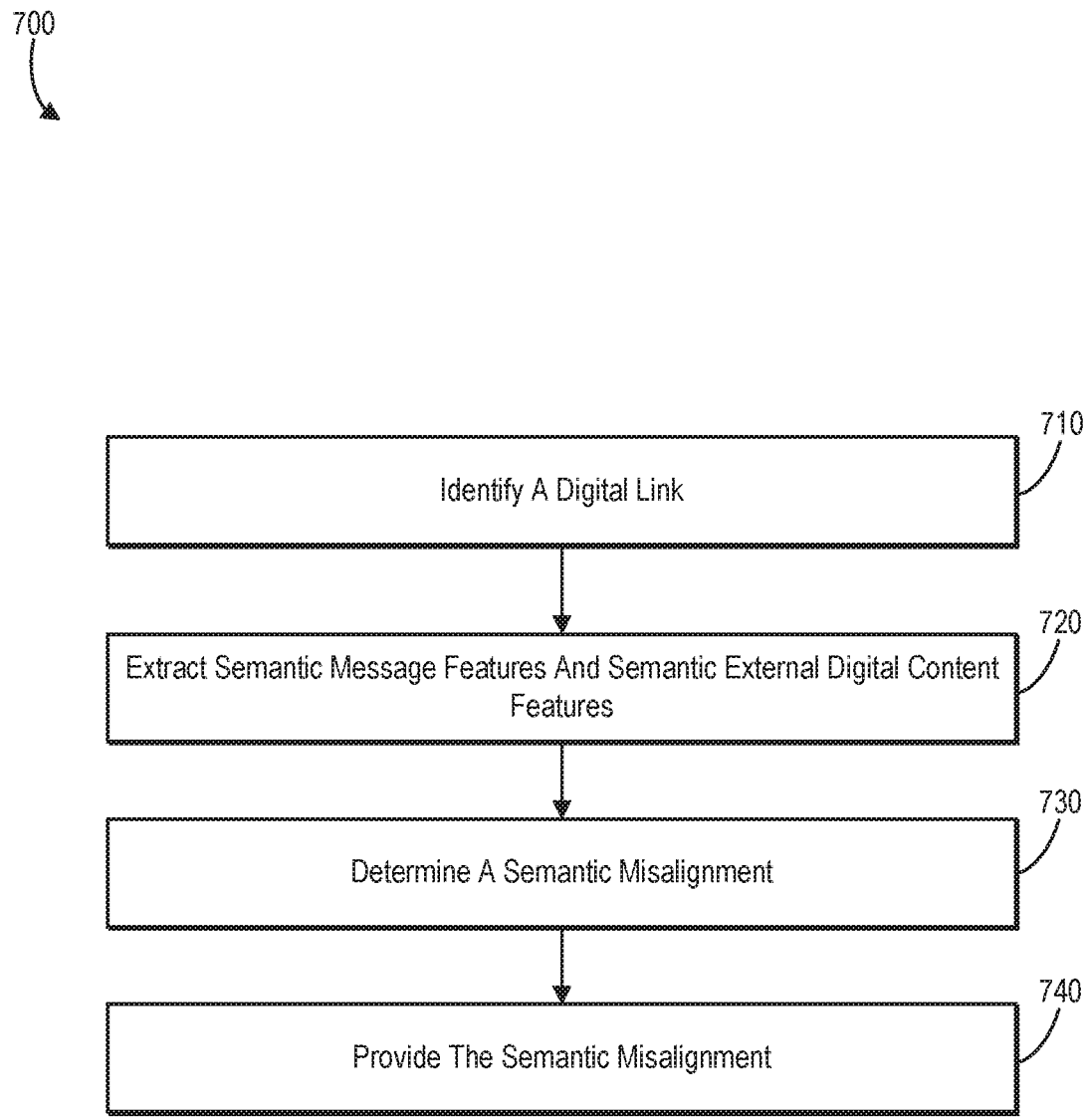
FIG. 7 illustrates a flowchart of a series of acts in a method of determining semantic misalignments of links and external digital content in accordance with one or more embodiments.

Turning now to FIG. 7, this figure illustrates a flowchart of a method for identifying misalignments in digital references (i.e., links). While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions that, when executed by one or more processors, cause a computing device to perform the acts of FIG. 7. In still further embodiments, a system can perform the acts of FIG. 7.

The series of acts 700 includes an act 710 of identifying a digital link. For example, the act 710 includes identifying, within a digital message, a digital link to external digital content. In at least one embodiment, and as illustrated above, the digital link comprises a hyperlink in an electronic message that has been registered to the digital misalignment system 118. The link may reference external digital content, including external landing pages.

As shown in FIG. 7, the series of acts 700 also includes an act 720 of extracting semantic message features and semantic external digital content features. For example, the act 720 includes extracting semantic message features from the digital message and semantic external digital content features from the external digital content. The act 720 can also include, extracting global message features from the digital message, extracting digital link features from the digital link, and weighting the global message features and the digital link features to generate the semantic message features. Moreover, in one or more embodiments, the act 720 includes generating a global message feature vector; extracting the digital link features from the digital link can include generating a digital link feature vector; and extracting the semantic external digital content features can include generating a semantic external digital content feature vector. Further, the act 720 can include extracting the semantic message features from a digital image of the digital message. Moreover, in one or more embodiments, the act 720 includes extracting the semantic message features and the semantic external digital content features from a first digital image associated with the digital message and a second digital image associated with the external digital content.

The act 720 also includes periodically retrieving the external digital content to extract semantic digital content features from the external digital content, the semantic digital content features comprising a first set of semantic external digital content features corresponding to a first time period. The act 720 also includes retrieving the external digital content and extract the first set of semantic external digital content features during the first time period, wherein the first time period is after the digital message has been sent to at least one recipient As shown in FIG. 7, the series of acts 700 also includes an act 730 of determining a semantic misalignment. For example, the act 730 can include determining a semantic misalignment between the digital message and the external digital content by comparing the semantic message features and the semantic external digital content features. Additionally, the act 730 can include determining a relevance score by comparing the digital link feature vector and the global message feature vector with the external digital content feature vector. Further, the act 730 can also include determining the semantic misalignment between the digital link and the external digital content by determining that the relevance score satisfies a relevance score threshold. Additionally, the act 730 can also include determining a semantic misalignment between the digital link and the external digital content by comparing the global message features, the digital link features, and the first set of semantic external digital content features.

As illustrated in FIG. 7, the series of acts 700 also includes an act 740 of providing the semantic misalignment for display. In particular, the act 740 can include providing for display to a publisher device a notification of the semantic misalignment. For example, in at least one embodiment, the act 740 includes providing a notification of the semantic misalignment. Moreover, the act 740 can also include providing for display to the publisher device the notification of the semantic misalignment by providing for display a user interface that comprises a plurality of digital messages corresponding to a publisher and an indication of semantic misalignments for the plurality of digital messages, wherein the plurality of digital messages comprises the digital message and the indication of semantic misalignments comprise an indication of the determined semantic misalignment.

In one or more embodiments, the act 740 can also include providing for display to the publisher device the notification of the semantic misalignment by providing a user interface that comprises the digital message, the external digital content, and an indication of the relevance score corresponding to the determined semantic misalignment. Additionally, the act 740 can include providing for display to the publisher device the notification of the determined semantic misalignment comprises by providing for display a user interface that comprises the digital message, the external digital content, and overlapping keywords between the digital message and the external digital content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
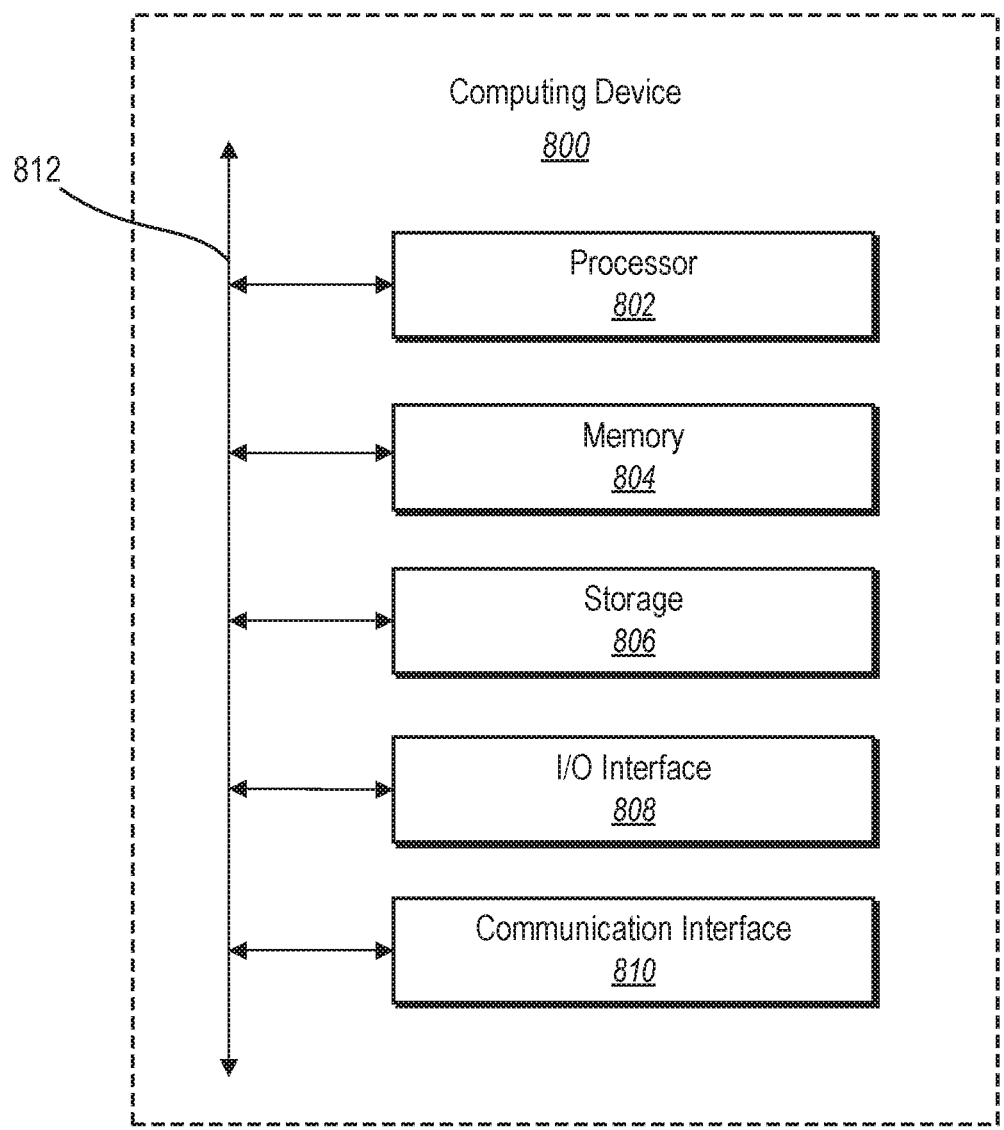
FIG. 8 illustrates a block diagram of an exemplary computing device in accordance with one or more embodiments.

FIG. 8 illustrates a block diagram of a computing device 800 that may be configured to perform one or more of the processes described above. One will appreciate that one or more computing devices such as the computing device 800 may implement the digital misalignment system 118 and the campaign management system 102. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for generating and providing digital messages with digital references to dynamic digital content, a computer-implemented method for identifying misalignments in the digital references, comprising:
  identifying, within a digital message, a digital link to external digital content;
  extracting a semantic message feature vector from the digital message by:
    extracting a global message feature vector from the digital message utilizing a first machine-learning model;
    extracting a digital link feature vector from the digital link utilizing a second machine-learning model; and
    applying a first weight to the global message feature vector and a second weight to the digital link feature vector;
  extracting a semantic external digital content feature vector from the external digital content;
  determining a semantic misalignment between the digital message and the external digital content by comparing the semantic message feature vector and the semantic external digital content feature vector; and providing for display to a publisher device a notification of the semantic misalignment between the digital message and the external digital content.

2. The computer-implemented method of claim 1, wherein the external digital content comprises a landing page and the digital message comprises an email.

3. The computer-implemented method of claim 2, wherein providing for display to the publisher device the notification of the semantic misalignment comprises providing for display a user interface that comprises a plurality of emails corresponding to a publisher and an indication of semantic misalignments for the plurality of emails, wherein the plurality of emails comprises the email and the indication of semantic misalignments comprise an indication of the semantic misalignment.

4. The computer-implemented method of claim 2, wherein providing for display to the publisher device the notification of the semantic misalignment comprises providing for display a user interface that comprises the email, the landing page, and an indication of a relevance score corresponding to the semantic misalignment.

5. The computer-implemented method of claim 2, wherein providing for display to the publisher device the notification of the semantic misalignment further comprises providing for display a user interface that comprises the email, the landing page, the semantic misalignment, and overlapping keywords between the email and the landing page.

6. A non-transitory computer readable storage medium storing instructions thereon that, when executed by at least one processor, cause a computer system to:
   identify, within a digital message, a digital link to external digital content;
   extract a semantic message feature vector from the digital message by:
      extracting global message feature vector from the digital message utilizing a first machine-learning model;
      extracting a digital link feature vector from the digital link utilizing a second machine-learning model; and
      applying a first weight to the global message feature vector and a second weight to the digital link feature vector;
   extract semantic external digital content feature vector from the external digital content;
   determine a semantic misalignment between the digital message and the external digital content by comparing the semantic message feature vector and the semantic external digital content feature vector; and
   provide for display to a publisher device a notification of the semantic misalignment between the digital message and the external digital content.

7. The non-transitory computer readable storage medium as recited in claim 6, further comprising instructions that, when executed by the at least one processor, cause the computer system compare the semantic message feature vector and the semantic external digital content feature vector by:
   mapping the semantic message feature vector and the semantic external digital content feature vector within a semantic features space; and
   determining a distance between the semantic message feature vector and the semantic external digital content feature vector within the semantic features space.

8. The non-transitory computer readable storage medium as recited in claim 6, further comprising instructions that, when executed by the at least one processor cause the computer system to cause the computer system to extract the global message feature vector by extracting text features from the digital message.

9. The non-transitory computer readable storage medium as recited in claim 8, further comprising instructions that, when executed by the at least one processor, cause the computer system to determine a relevance score by comparing the digital link feature vector and the global message feature vector with the semantic external digital content feature vector.

10. The non-transitory computer readable storage medium as recited in claim 9, further comprising instructions that, when executed by the at least one processor, cause the computer system to determine the semantic misalignment between the digital link and the external digital content by determining that the relevance score satisfies a relevance score threshold.

11. The non-transitory computer readable storage medium as recited in claim 10, further comprising instructions that, when executed by the at least one processor, cause the computer system to extract the global message feature vector by extracting image features from a digital image of the digital message.

12. The non-transitory computer readable storage medium as recited in claim 11, further comprising instructions that, when executed by the at least one processor, cause the computer system to provide for display to the publisher device the notification of the semantic misalignment by providing for display a user interface that comprises a plurality of digital messages corresponding to a publisher and an indication of semantic misalignments for the plurality of digital messages, wherein the plurality of digital messages comprises the digital message and the indication of semantic misalignments comprise an indication of the determined semantic misalignment.

13. The non-transitory computer readable storage medium as recited in claim 12, further comprising instructions that, when executed by the at least one processor, cause the computer system to provide for display to the publisher device the notification of the semantic misalignment by providing a user interface that comprises the digital message, the external digital content, and an indication of the relevance score corresponding to the determined semantic misalignment.

14. The non-transitory computer readable storage medium as recited in claim 6, further comprising instructions that, when executed by the at least one processor, cause the computer system to provide the notification of the determined semantic misalignment comprises by providing, for display at the publisher device, a user interface that comprises the digital message, the external digital content, and overlapping keywords between the digital message and the external digital content.

15. The non-transitory computer readable storage medium as recited in claim 6 further comprising instructions that, when executed by the at least one processor, cause the computer system to:
   extract the semantic message feature vector from a first digital image associated with the digital message; and
   extract the semantic external digital content feature vector from a second digital image associated with the external digital content.

16. A system comprising:
at least one processor; and
at least one non-transitory computer readable storage medium storing instructions thereon that, when executed by the at least one processor, cause the system to:
  identify, within a digital message, a digital link to external digital content;
  extract a semantic message feature vector from the digital message by:
    extracting global message feature vector from the digital message utilizing a first machine-learning model;
    extracting a digital link feature vector from the digital link; and
    applying a first weight to the global message feature vector and a second weight to the digital link feature vector;
  periodically retrieve the external digital content to extract semantic digital content feature vectors from the external digital content, the semantic digital content feature vectors comprising a first set of semantic external digital content feature vectors corresponding to a first time period;
  determine a semantic misalignment between the digital link and the external digital content by comparing the global message feature vector, the digital link feature vector, and the first set of semantic external digital content feature vectors; and
  provide for display to a publisher device a notification of the semantic misalignment between the digital message and the external digital content.

17. The system as recited in claim 16, further comprising instructions that, when executed by the at least one processor, cause the system to retrieve the external digital content and extract the first set of semantic external digital content feature vectors during the first time period, wherein the first time period is after the digital message has been sent to at least one recipient.

18. The system as recited in claim 17, further comprising instructions that, when executed by the at least one processor, cause the system to provide, for display to the publisher device, a user interface that comprises a plurality of digital messages corresponding to a publisher and an indication of semantic misalignments for the plurality of digital messages, wherein the plurality of digital messages comprises the digital message and the indication of semantic misalignments comprise an indication of the determined semantic misalignment.

19. The system as recited in claim 18, further comprising instructions that, when executed by the at least one processor, cause the system to provide, for display a user interface, that comprises the digital message, the external digital content, and an indication of a relevance score corresponding to the determined semantic misalignment.

20. The system as recited in claim 16, further comprising instructions that, when executed by the at least one processor, cause the system to present a user interface that comprises the digital message, the external digital content, the semantic misalignment, and overlapping keywords between the digital message and the external digital content.

* * * * *